(12) United States Patent
Kobashi et al.

(10) Patent No.: US 9,619,150 B2
(45) Date of Patent: Apr. 11, 2017

(54) DATA ARRANGEMENT CONTROL METHOD AND DATA ARRANGEMENT CONTROL APPARATUS

(71) Applicant: FUJITSU LIMITED, Kawasaki-shi, Kanagawa (JP)

(72) Inventors: Hiromichi Kobashi, London (GB); Toshihiro Shimizu, Kawasaki (JP); Yuichi Tsuchimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 14/575,531

(22) Filed: Dec. 18, 2014

(65) Prior Publication Data

US 2015/0186048 A1    Jul. 2, 2015

(30) Foreign Application Priority Data

Dec. 26, 2013 (JP) ................ 2013-269648

(51) Int. Cl.
*G06F 12/00* (2006.01)
*G06F 3/06* (2006.01)
(Continued)

(52) U.S. Cl.
CPC ............ *G06F 3/0607* (2013.01); *G06F 3/061* (2013.01); *G06F 3/064* (2013.01); *G06F 3/0656* (2013.01); *G06F 3/0674* (2013.01); *G06F 12/0862* (2013.01); *G06F 12/0871* (2013.01); *G06F 12/122* (2013.01); *G06F 12/123* (2013.01);
(Continued)

(58) Field of Classification Search
CPC ..... G06F 3/0601; G06F 3/0676; G06F 3/0689
See application file for complete search history.

(56) References Cited

U.S. PATENT DOCUMENTS 5,596,736 A    1/1997  Kerns
6,381,677 B1 * 4/2002  Beardsley ........... G06F 12/0862
                                                          711/113
(Continued)

FOREIGN PATENT DOCUMENTS

JP        6-44137      2/1994
JP        7-319771    12/1995
(Continued)

OTHER PUBLICATIONS

Extended European Search Report dated May 20, 2015 for corresponding European Patent Application No. 14199635.5, 6 pages.

*Primary Examiner* — Ryan Bertram
*Assistant Examiner* — Trang Ta
(74) *Attorney, Agent, or Firm* — Fujitsu Patent Center

(57) ABSTRACT

An operation unit updates grouping information about grouping of data sets stored in a storage device, based on access information about access to data stored in the storage device and memory loading information about data loaded and held in a memory according to access to data stored in the storage device. The operation unit updates data arrangement in the storage device according to the updating of the grouping information. In the updating of the grouping information, the operation unit updates the grouping information based on relationship information between data sets according to the access information.

5 Claims, 24 Drawing Sheets

(51) Int. Cl.
*G06F 12/0862* (2016.01)
*G06F 12/0871* (2016.01)
G06F 12/122 (2016.01)
G06F 12/123 (2016.01)

(52) U.S. Cl.
CPC .............. *G06F 2212/1016* (2013.01); *G06F 2212/1044* (2013.01); *G06F 2212/502* (2013.01); *G06F 2212/6024* (2013.01)

(56) References Cited

U.S. PATENT DOCUMENTS

| | | | |
|---|---|---|---|
| 2003/0014603 A1* | 1/2003 | Sasaki | G06F 12/126 711/158 |
| 2008/0091908 A1 | 4/2008 | Bhattacharjee et al. | |
| 2008/0168220 A1 | 7/2008 | Gill et al. | |
| 2008/0270706 A1 | 10/2008 | Fair et al. | |
| 2012/0173801 A1* | 7/2012 | Sasaki | G06F 3/0613 711/103 |
| 2013/0246427 A1* | 9/2013 | Murata | G06F 17/30598 707/737 |
| 2015/0058365 A1* | 2/2015 | Perez | G06F 17/30988 707/752 |

FOREIGN PATENT DOCUMENTS

| | | |
|---|---|---|
| JP | 8-272689 | 10/1996 |
| WO | 2013/114538 A1 | 8/2013 |
| WO | 2013/165386 A1 | 11/2013 |

\* cited by examiner

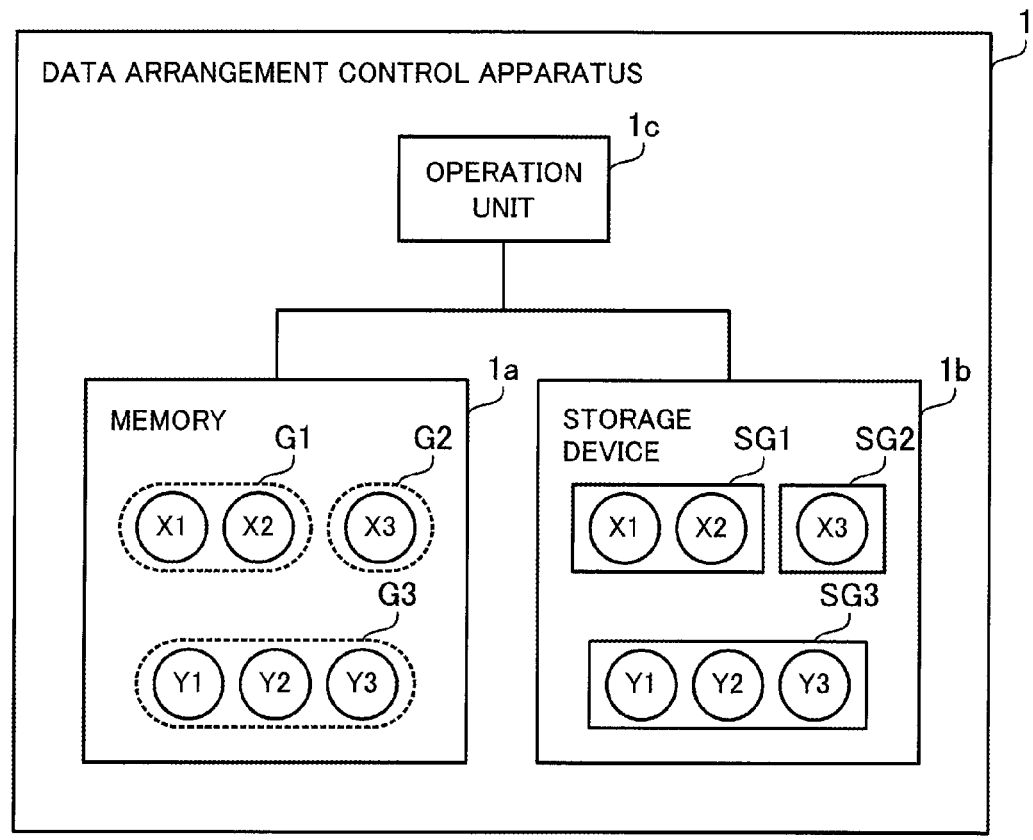
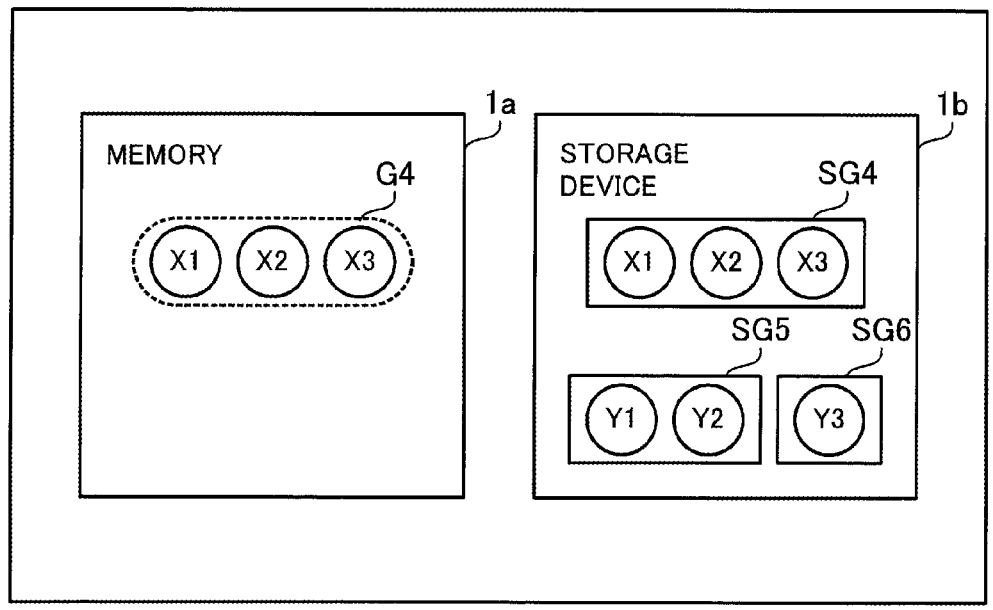
FIG. 1

FIG. 20

| ACCESS COUNT TABLE | 135 |
|---|---|
| DATA | ACCESS COUNT |
| A | 3 |
| B | 2 |
| C | 0 |
| E | 2 |
| F | 1 |
| G | 0 |
| ... | ... |

DATA ARRANGEMENT CONTROL METHOD AND DATA ARRANGEMENT CONTROL APPARATUS

CROSS-REFERENCE TO RELATED APPLICATION

This application is based upon and claims the benefit of priority of the prior Japanese Patent Application No. 2013-269648, filed on Dec. 26, 2013, the entire contents of which are incorporated herein by reference.

FIELD

The embodiments discussed herein relate to a data arrangement control method and a data arrangement control apparatus.

BACKGROUND

Nowadays, various types of devices are used which are capable of storing data. One of the requirements for a device storing data is faster data access.

For example, a storage device is provided with a memory called a "cache" which allows relatively high-speed access, and reads not-yet-requested data set ahead from the storage device to store it in the cache. When a request is made for a data set which has been read ahead, the requested data set is read from the cache and sent to the requestor, whereby a faster data response is achieved.

For example, there is a proposal for a disk storage, when the request from the host is a sequential read, to read ahead the data following the request data on the disk storage into the cache buffer after transferring the request data to the host. In the proposal, the number of times all the target data requested to be read existed in the cache buffer (full-hit count) and the number of times a part of the target data existed in the cache buffer (half-hit count) are recorded and compared. When the half-hit count is larger, the size of read-ahead space is increased based on an assumption that the size of read-ahead space is insufficient in the cache buffer used for a one-time read-ahead. When the full-hit count is larger, the size of read-ahead space is reduced, based on an assumption that the size of read-ahead space is too large.

In addition, there is also a proposal of a disk controller which divides the cache memory into a plurality of cache segments and performs data transfer in terms of cache segments. In the proposal, the number of divisions of the cache memory is changed to expand the capacity of a cache segment when data transfer of an amount of data exceeding the capacity of the cache segment is requested for more than a predetermined count, according to the history of the amount of data transferred.

Furthermore, there is a proposal of grouping data sets in order to destage the data sets from the cache memory to an auxiliary storage device, and writing the grouped data sets to an unallocated data accumulation area which is closest to the physical position of the read/write head of the auxiliary storage device.

For example, see Japanese Laid-Open Patent Publications No. 8-272689, No. 7-319771, and No. 6-44137.

It is conceivable to group data sets having relationship (e.g., very likely to be sequentially accessed) and arrange them in a continuous area on a storage device (e.g., disk device etc.). This is because data sets may be read ahead more effectively than when arranged in a discontinuous area. Therefore, it is conceivable to group data sets which are not arranged continuously on the storage device but may be accessed in association with one another, using relationship-related information (e.g., access history to a plurality of data sets).

In this case, the more relationship-related information is used, the higher the precision of grouping rises. However, the amount of computation increases according to the amount of the relationship-related information for use, and therefore there is a need to suppress the amount of information to a certain degree in order to prevent occurrence of overhead of data arrangement on the storage device. When, on the other hand, insufficient relationship-related information for use results in reduced precision of grouping of data arrangement, which restricts efficiency degree of data access by grouping.

SUMMARY

According to an aspect, there is provided a non-transitory computer-readable storage medium storing a data arrangement control program that causes a computer to perform a process including: updating grouping information about grouping of data sets stored in a storage device, based on access information about access to data stored in the storage device and memory loading information about data loaded and held in a memory according to access to data stored in the storage device; and updating data arrangement in the storage device according to the updating of the grouping information, wherein the updating grouping information includes updating the grouping information based on relationship information between data sets according to the access information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a data arrangement control apparatus of a first embodiment;

FIG. 20 illustrates an exemplary access count table in a fifth embodiment;

DESCRIPTION OF EMBODIMENTS

Figure 2:
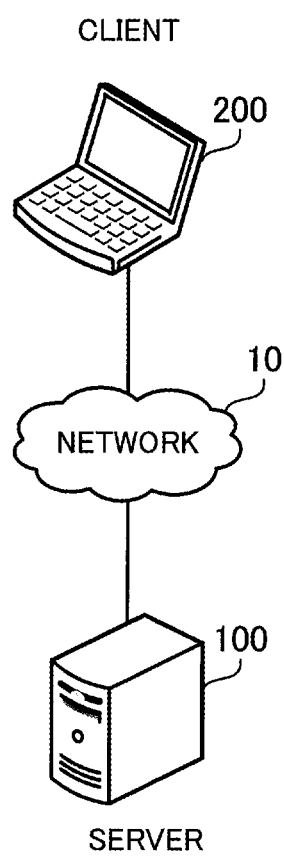
FIG. 2 illustrates an information processing system of a second embodiment.

Several embodiments will be described below with reference to the accompanying drawings, wherein like reference numerals refer to like elements throughout.

First Embodiment

FIG. 1 illustrates a data arrangement control apparatus of a first embodiment. A data arrangement control apparatus 1 stores various types of data. The data arrangement control apparatus 1 receives access requests to data from other devices (illustration omitted) connected via a network. An access request is a read request with data being specified. The data arrangement control apparatus 1 transmits data according to the access request to a requestor device. In addition, software operating on the data arrangement control apparatus 1 may generate an access request. When software operating on the data arrangement control apparatus 1 has generated an access request, the data arrangement control apparatus 1 provides data to the software of the access requestor according to the request.

The data arrangement control apparatus 1 has a memory 1a, a storage device 1b, and an operation unit 1c. The data arrangement control apparatus 1 groups a plurality of data sets held in the memory 1a, according to the access to the plurality of data sets, and arranges them in the storage device 1b. The memory 1a is a volatile storage device such as a RAM (Random Access Memory). The memory 1a is used as a cache for temporarily holding data which has been stored in the storage device 1b.

The storage device 1b is a nonvolatile storage device such as an HDD (Hard Disk Drive). The storage device 1b may be installed outside the data arrangement control apparatus 1. For example, the storage device 1b may be connected to the data arrangement control apparatus 1 via a network. The storage device 1b stores a plurality of data sets used for processing by software, or the like, operating on other devices or on the data arrangement control apparatus 1.

The operation unit 1c includes a processor, for example. The processor may be a CPU (Central Processing Unit) or a DSP (Digital Signal Processor), or may be an electronic circuit for a particular use such as an ASIC (Application Specific Integrated Circuit) or an FPGA (Field Programmable Gate Array). In addition, a set of a plurality of processors (multiprocessor) may be referred to as a processor. The processor may execute a program stored in the memory 1a, for example.

The operation unit 1c groups and manages data sets stored in the storage device 1b. Specifically, the operation unit 1c provides a continuous storage area (referred to as segment) in the storage device 1b for each group and arranges data sets belonging to the group. Upon receiving an access request to any of the data sets belonging to a group, the operation unit 1c reads data sets from a segment in terms of groups, and stores them in the memory 1a. For example, storing data sets which may be sequentially accessed in the same segment may improve the cache hit rate of the data set to be read next (probability of reading from the memory 1a).

Here, grouping information about grouping of the data sets stored in the storage device 1b is stored in the memory 1a or the storage device 1b. As an example, the storage device 1b stores data sets X1, X2, X3, Y1, Y2 and Y3. The grouping information indicates, for example, the belonging relation of a data set to a group as follows. The data sets X1 and X2 belong to a group G1. The data set X3 belongs to a group G2. The data sets Y1, Y2 and Y3 belong to a group G3. In addition, the data sets X1, X2 are arranged in a segment SG1. The data set X3 is arranged in a segment SG2. The data sets Y1, Y2 and Y3 are arranged in a segment SG3.

Upon receiving an access request to the data set X1, for example, the operation unit 1c reads the data sets X1 and X2 from the segment SG1, stores them in the memory 1a, and returns the data set X1 to the requestor (data set X2 is read ahead). Upon receiving an access to the data set X3, the operation unit 1c reads the data set X3 from the segment SG2, stores it in the memory 1a, and returns the data set X3 to the requestor (no data is read ahead). Upon receiving an access to the data set Y2, the operation unit 1c reads the data sets Y1, Y2 and Y3 from the segment SG3, stores them in the memory 1a, and returns the data set Y2 to the requestor (data sets Y1 and Y3 are read ahead). The operation unit 1c uses memory loading information to manage the data loaded and held in the memory 1a. The memory loading information is stored in the memory 1a or the storage device 1b.

The operation unit 1c updates the grouping information about grouping of the data sets stored in the storage device 1b, based on the access information about access to data stored in the storage device 1b, and the memory loading information about the data which has been loaded and held in the memory 1a according to access to the data sets stored in the storage device 1b. At this time, the operation unit 1c updates the grouping information based on relationship information between data sets according to the access information.

For example, the operation unit 1c acquires relationship information between the data sets X1 and X3 according to the access information. The relationship information is information about relationship between the data sets X1 and X3. For example, the operation unit 1c detects a relation that the data sets X1 and X3 are sequentially accessed, according to the relationship information. The operation unit 1c then updates the grouping information about the groups G1 and G2.

Specifically, it is conceivable that the operation unit 1c updates the groups G1 and G2 to a group G4 (group integration). This is because the data sets belonging to the groups G1 and G2 are related to each other and likely to be accessed in a short time. Here, it is conceivable that a threshold value is provided for the size of a group (total number of data sets or sum of data sizes) so that the size of the group does not grow infinitely large. Specifically, groups are integrated when the sum of sizes of groups to be integrated does not exceed the threshold value, whereas the groups are not integrated when the sum exceeds the threshold value.

On the other hand, although there once existed relationship when the groups were integrated, the relationship may weaken over time. Therefore, the operation unit 1c may detect, from the access information, a data set whose relationship with other data sets in a group is estimated to be weakened, and exclude the detected data set from the group.

For example, it is conceivable that the data set which has not been accessed while being held in the memory 1a is excluded from the group G3 at a timing when allocation of storage area in the memory 1a to the group G3 is released by a predetermined method (LRU (Least Recently Used) etc.). This is because the data set which has not been accessed is considered to have a weakened relationship with other data sets in the group G3. For example, when the data set Y3 has not been accessed, the operation unit 1c performs an update to exclude the data set Y3 from the group G3 in the grouping information. Specifically, there are created a group to which the data sets Y1 and Y2 belong, and a group to which the data set Y3 belongs (group division).

The operation unit 1c updates the data arrangement of the storage device 1b according to the updating of the grouping information. For example, when the data sets X1, X2 and X3 are integrated into a single group G4, the data sets X1, X2, X3 are arranged in the segment SG4 in place of the segments SG1 and SG2. The segment SG4 may be a different storage area from the segments SG1 and SG2 (area of the segments SG1 and SG2 is assumed to be reusable).

In addition, when the data sets Y1 are Y2 belong to one group and the data set Y3 belongs to another group, the operation unit 1c arranges the data sets Y1 and Y2 in the segment SG5, in place of the segment SG3, and arranges the data set Y3 in the segment SG6. The segments SG5 and SG6 may be a storage area different from that of the segment SG3 (area of the segment SG3 is assumed to be reusable).

According to the data arrangement control apparatus 1, the grouping information about grouping of the data sets stored in the storage device 1b is updated, based on the access information about access to data sets stored in the storage device 1b, and the memory loading information about the data which has been loaded and held in the memory 1a according to access to data sets stored in the storage device 1b. According to the updating of the grouping information, the data arrangement of the storage device 1b is updated. In the updating of the grouping information, updating of the grouping information is performed based on the relationship information between data sets according to the access information.

Accordingly, the amount of accumulated information about data arrangement and the amount of computation may be suppressed. Specifically, only the information while the data sets X1, X2, X3, Y1, Y2 and Y3 are held in the memory 1a is needed as information used to update the grouping information (group updating). Therefore, the past access history to the data sets X1, X2, X3, Y1, Y2 and Y3 need not be kept in its entirety. Therefore, the amount of accumulated information may be suppressed. In addition, the amount of information to be processed for group updating may be reduced and therefore the amount of computation with regard to data arrangement may be suppressed. In addition, integrating or dividing groups as described above may cause data sets having stronger relationship to belong to the same group, which leads to an improved precision of grouping.

Second Embodiment

FIG. 2 illustrates an information processing system of a second embodiment. The information processing system of the second embodiment includes a server 100 and a client 200. The server 100 and the client 200 are connected to a network 10. The network 10 may be a LAN (Local Area Network), or a wide area network such as a WAN (Wide Area Network) or the Internet.

The server 100 is a server computer storing various types of data. The server 100 receives an access request to a data set from the client 200. The access request is a request to read a data set. For example, the server 100 returns the requested data set to the client 200. The server 100 may also receive an access request to a data set from software operating on the server 100. When the access request is received from the software operating on the server 100, the server 100 may also return the requested data set to the software of the access requestor.

The server 100 collectively manages data sets, which are likely to be sequentially accessed, in a single group. Upon receiving an access request to a data set, the server 100 stores, in a cache, data sets in terms of groups to which the data sets having received the access request belong (i.e., the whole data sets each belonging to the group to which the data set having received the access request belongs). Accordingly, it is possible to improve a cache hit rate when having received an access request to a data set which has not yet received an access request. Here, the server 100 is an example of the data arrangement control apparatus 1 of the first embodiment.

The client 200 is a client computer used by a user. For example, the client 200 transmits, to the server 100, an access request to a predetermined data set, according to the processing the client 200 performs. In addition, the user may also operate the client 200 to transmit an access request to a data set from the client 200 to the server 100. The user may also directly operate the server 100 to input an access request to a data set to the server 100.

Figure 3:
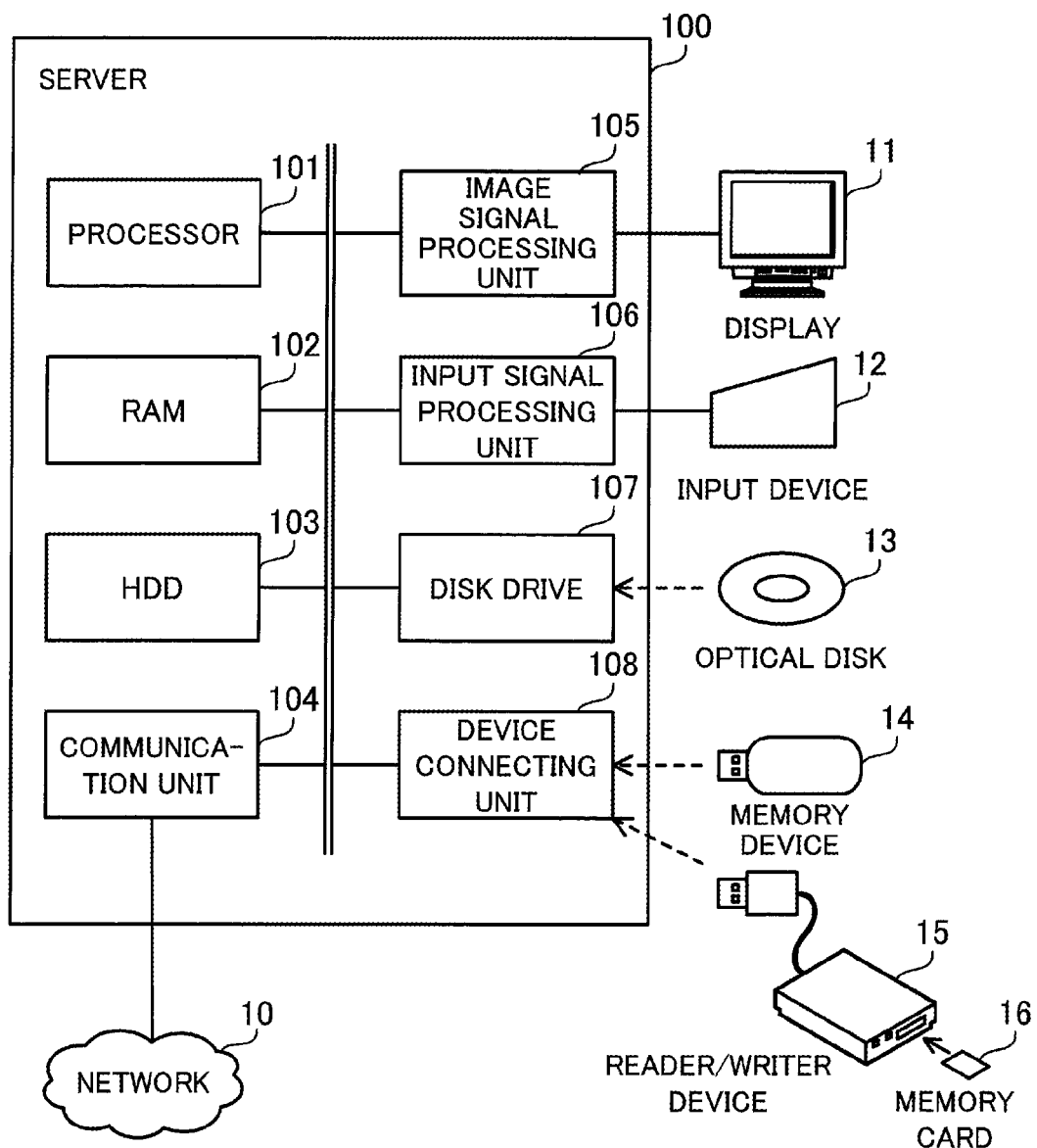
FIG. 3 illustrates exemplary hardware of a server of the second embodiment.

FIG. 3 illustrates exemplary hardware of the server of the second embodiment. The server 100 has a processor 101, a RAM 102, an HDD 103, a communication unit 104, an image signal processing unit 105, an input signal processing unit 106, a disk drive 107, and a device connecting unit 108. Each unit is connected to a bus of the server 100. The client 200 may also be implemented by hardware which is similar to the server 100.

The processor 101 controls the information processing of the server 100. The processor 101 may be, for example, a CPU, a DSP, an ASIC, or an FPGA. The processor 101 may be multiprocessor. The processor 101 may be a combination of two or more of a CPU, a DSP, an ASIC, and an FPGA.

The RAM 102 is the main storage device of the server 100. The RAM 102 temporarily stores at least a part of the program of the OS (Operating System) or application programs to be executed by the processor 101. In addition, the RAM 102 stores various data to be used for processing by the processor 101.

The HDD 103 is an auxiliary storage device of the server 100. The HDD 103 magnetically writes or reads data to and from a built-in magnetic disk. The HDD 103 stores the program of the OS, application programs, and various data sets. The server 100 may have another type of auxiliary storage device such as a flash memory or an SSD (Solid State Drive), or a plurality of auxiliary storage devices.

The communication unit 104 is a communication interface which allows communication with other computers via the network 10. The communication unit 104 may be a wired communication interface, or a wireless communication interface.

The image signal processing unit 105 outputs an image to a display 11 connected to the server 100, according to an instruction from the processor 101. A CRT (Cathode Ray Tube) display or a liquid crystal display may be used as the display 11.

The input signal processing unit 106 acquires an input signal from an input device 12 connected to the server 100 and outputs it to the processor 101. A pointing device such as a mouse or a touch panel, or a keyboard may be used as the input device 12, for example.

The disk drive 107 is a drive unit which reads programs or data sets stored on an optical disk 13, using laser beam or the like. A DVD (Digital Versatile Disc), a DVD-RAM, a CD-ROM (Compact Disc Read Only Memory), a CD-R (Recordable)/RW (ReWritable), or the like may be used as the optical disk 13, for example. According to an instruction from the processor 101, for example, the disk drive 107 stores programs or data which have been read from the optical disk 13 in the RAM 102 or the HDD 103.

The device connecting unit 108 is a communication interface for connecting peripheral devices to the server 100. For example, the device connecting unit 108 may have a memory device 14 or a reader/writer device 15 connected thereto. The memory device 14 is a storage medium provided with a communication function with the device connecting unit 108. The reader/writer device 15 is a device which writes or reads data to or from a memory card 16. The memory card 16 is a card-like storage medium. The device connecting unit 108 stores programs or data which have been read from the memory device 14 or the memory card 16 in the RAM 102 or the HDD 103, according to an instruction from the processor 101, for example.

Figure 4:
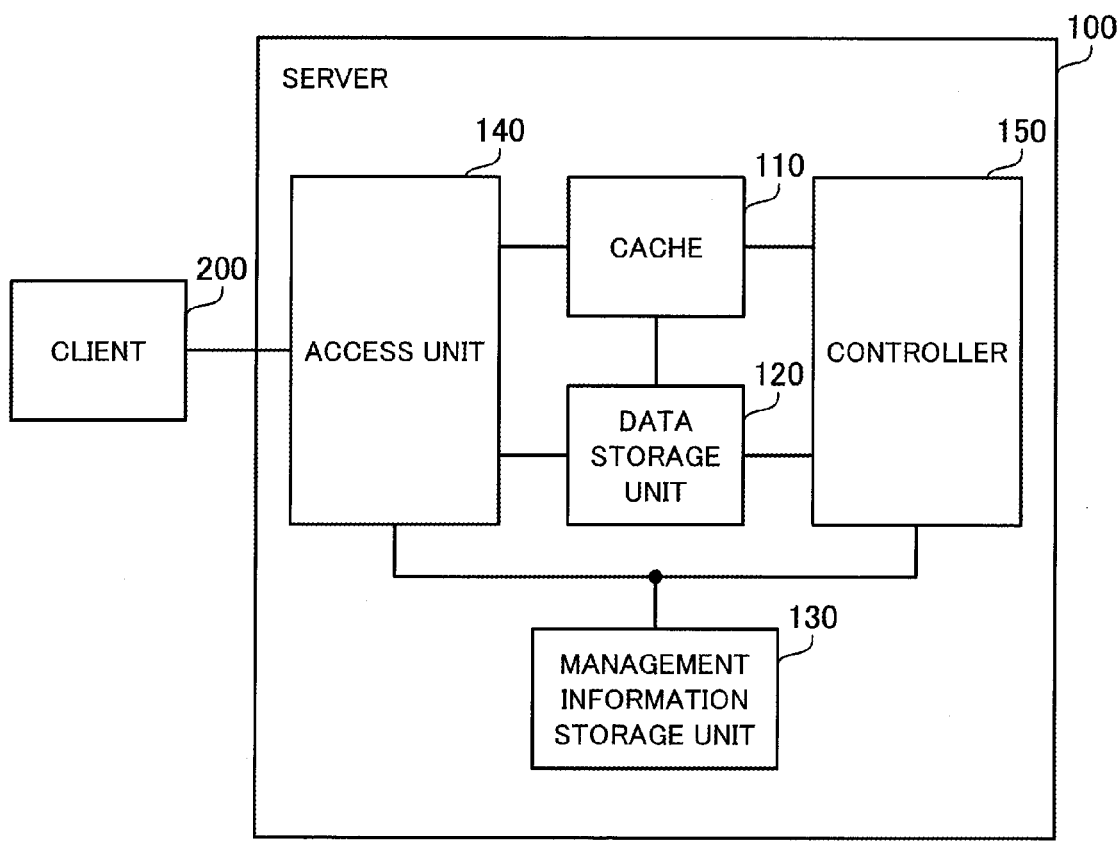
FIG. 4 illustrates an exemplary function of the server of the second embodiment.

FIG. 4 illustrates an exemplary function of the server of the second embodiment. The server 100 has a cache 110, a data storage unit 120, a management information storage unit 130, an access unit 140, and a controller 150. The access unit 140 and the controller 150 may be modules of programs executed by the processor 101.

The cache 110 may be realized using a storage area secured in the RAM 102. The data storage unit 120 may be realized using a storage area secured in the HDD 103. The management information storage unit 130 may be realized using a storage area secured in the RAM 102 or the HDD 103. However, the data storage unit 120 may be a storage area of a storage device connected to the server 100 via the network 10. The data storage unit 120 may be a storage area of the storage device externally connected to the server 100.

The cache 110 allows faster random access than the data storage unit 120. The cache 110 is used as a cache for the data storage unit 120 and temporarily stores data which has been read from the data storage unit 120.

The data storage unit 120 stores various data managed by the server 100. The data storage unit 120 stores a single group in a continuous storage area. This is because sequentially accessing a single group increases the speed of reading in terms of groups. In the following description, a continuous storage area for storing a group in the data storage unit 120 may be referred to as a "segment".

The management information storage unit 130 stores management information used for processing by the access unit 140 and the controller 150. Specifically, the management information storage unit 130 stores information indicating to which group each data set belongs and a threshold value indicating the upper limit of the number of data sets belonging to one group (also referred to as a threshold value of the number of data sets). The number of data sets in a group corresponds to the number of data sets to be stored in a segment described below and therefore a threshold value of the number of data sets may also be regarded as a threshold value of segment size. In addition, the management information storage unit 130 stores memory loading information managing the data set held in the cache 110 (data held in a memory). Furthermore, the management information storage unit 130 stores access information about each data set. The access information includes information about presence or absence of access to the data set held in the cache 110 and information for detecting a relation between data sets (relationship information).

The access unit 140 receives an access request to a data set from software (illustration omitted) on the client 200 or the server 100. The access unit 140 returns the data set requested to be accessed to the requestor (software on the client 200 or the server 100). The access unit 140 detects two data sets which have been sequentially accessed as related data sets, and notifies the controller 150 of the detection result. In addition, the access unit 140 reads ahead the data set which has not yet been requested to be accessed. Here, "sequentially accessed" indicates that two data sets have been sequentially accessed within a predetermined time-out period from the same access requestor. Access requestors may be distinguished in various units, such as in units of software, in units of processes of software, or in units of client computers.

For example, the access unit 140 may store a data set just requested to be accessed in the access information stored in the management information storage unit 130 as relationship information for each access requestor, and detect data sets sequentially accessed. Also the client 200 may include the identification information of the data set just requested to be accessed in the current access request. When the identification information of the data set just requested to be accessed is included in the current access request, the access unit 140 may grasp the data set just accessed by the client 200 and detect a relation between data sets by referring to the current access request. In other words, the access unit 140 may acquire the relationship information between data sets from the access requestor such as the client 200.

Upon receiving an access request to a data set, and when the data set requested to be accessed does not exist in the cache 110 (cache miss), the access unit 140 reads, from the data storage unit 120, all the data sets belonging to the group of the data set requested to be accessed and stores them in the cache 110. Furthermore, the access unit 140 provides the requestor with the requested data set. Upon receiving an access request to a data set, and when the data set requested to be accessed exists in the cache 110 (cache hit), the access unit 140 reads, from the cache 110, the data set requested to be accessed and provides it to the access requestor.

In addition, the access unit 140 manages, for each data set, presence or absence of access to the data set held in the cache 110 and stores the result in the management information storage unit 130. Furthermore, the access unit 140 releases allocation of storage area in the cache 110 to the data sets for each group by a predetermined method (e.g., LRU).

Upon receiving a notification of the data sets sequentially accessed from the access unit 140, the controller 150 updates the management information stored in the management information storage unit 130, according to the content of the notification. Specifically, the controller 150 receives a notification from the access unit 140 that two data sets belonging to different groups have been sequentially accessed among the data sets stored in the cache 110. The controller 150 then determines whether or not the total number of data sets included in both groups exceeds the threshold value of the number of data sets. When the total number of data sets included in both groups does not exceed the threshold value of the number of data sets, the controller 150 updates the content of grouping so that each of the data sets included in both groups belongs to a single group (group integration). When the total number of data sets included in both groups exceeds the threshold value of the number of data sets, the groups are not integrated.

In addition, when allocation of storage area in the cache 110 to a data set belonging to one of the groups is released, the controller 150 updates the content of grouping of the data sets whose allocation has been released. Specifically, the controller 150 determines presence or absence of access to the data set to which allocation has been released while being held in the cache 110. The controller 150 then excludes the data set which has not been accessed while being held in the cache 110 from the group to which the unaccessed data set belongs, and causes the unaccessed data to belong to a newly created group (group division).

Upon updating the content of grouping as described above, the controller 150 reflects the result of updating in the data storage unit 120. Specifically, in the case of group integration, the controller 150 creates a segment corresponding to the integrated group in the data storage unit 120 and stores each data set which belonged to both groups before the integration in the new segment (segment integration). Additionally, in the case of group division, the controller 150 creates a segment corresponding to each of the divided groups in the data storage unit 120 and stores each data set which belonged to a group before the division in the segment corresponding to each of the divided groups (segment division). The original segment in which each data set was stored is managed as a reusable area.

Figure 5:
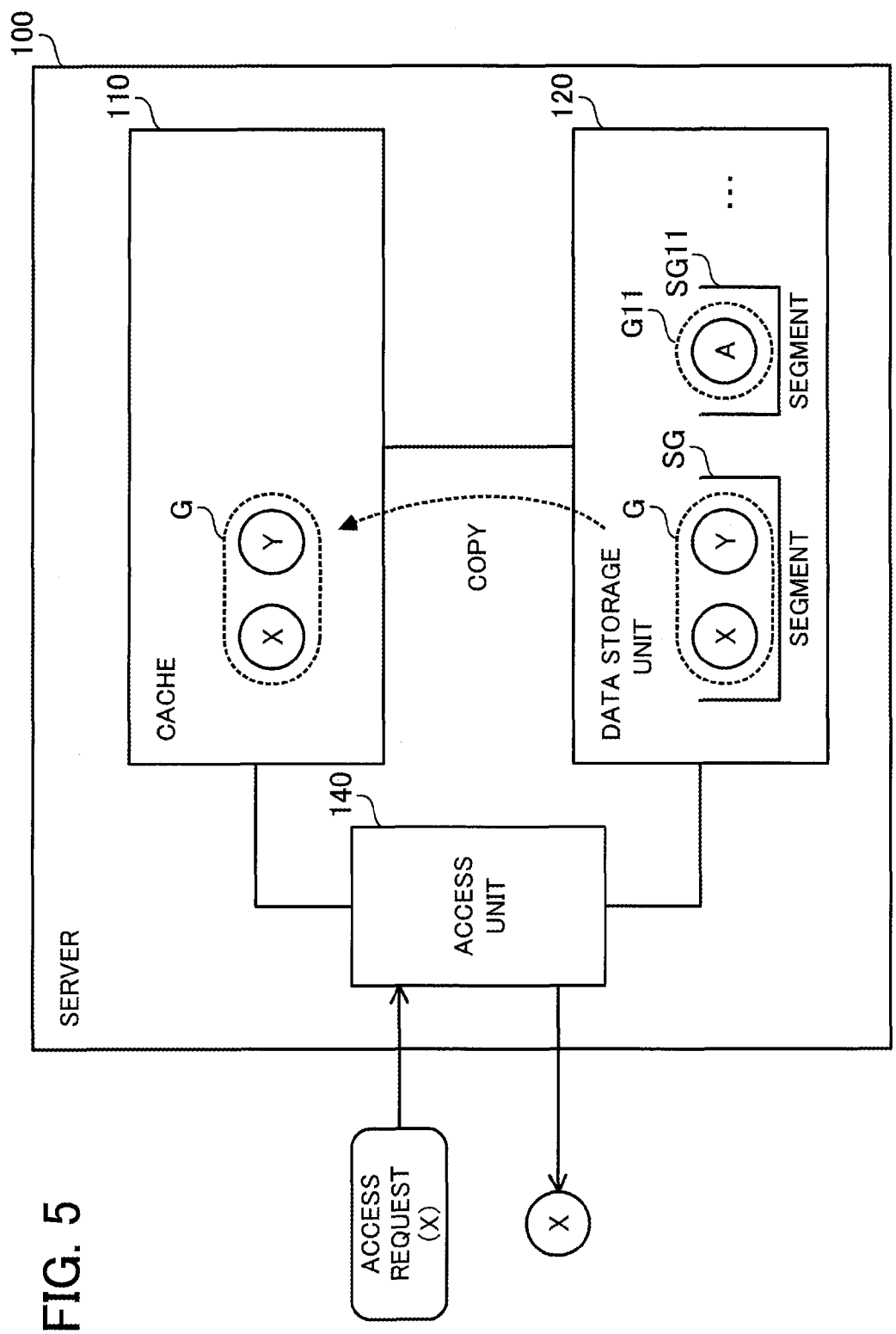
FIG. 5 illustrates an exemplary segment of the second embodiment.

FIG. 5 illustrates an exemplary segment of the second embodiment. The data storage unit 120 stores data sets X, Y and A. The data storage unit 120 stores a plurality of other data sets. The data sets X and Y, belonging to a group G, are stored in a segment SG of the data storage unit 120. The data set A, belonging to a group G11, is stored in a segment SG11 of the data storage unit 120.

For example, the access unit 140 receives an access request to the data set X from the client 200. Upon receiving the access request, and when the data set X is not stored in the cache 110, the access unit 140 copies the data sets X and Y in the segment SG existing in the data storage unit 120, and stores them in the cache 110. In addition, the access unit 140 returns the data set X to the requestor. The access unit 140 stores, in the management information storage unit 130, the fact that there was an access from the client 200 to the data set X this time (storage of relationship information).

In this case, as a result, the data set Y has been read ahead prior to the data set X. The access unit 140 may arrange the data sets X and Y in a continuous storage area of the cache 110. This is because sequentially accessing the data sets X and Y also on the cache 110 allows a continuous and fast access to the data sets X and Y.

Here, there is a one-to-one correspondence between groups and segments. For example, the group G is associated with the segment SG (data sets belonging to the group G are arranged in the segment SG). In addition, the group G11 is associated with the segment SG11 (data sets belonging to the group G11 are arranged in the segment SG11).

Figure 6:
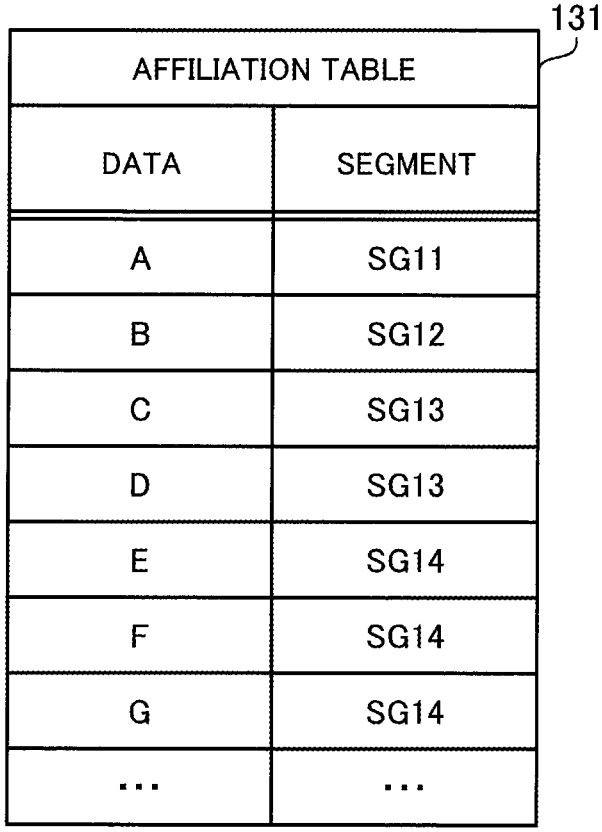
FIG. 6 illustrates an exemplary affiliation table in the second embodiment.

FIG. 6 illustrates an exemplary affiliation table in the second embodiment. An affiliation table 131 is information indicating segments storing data sets therein. Since there is a one-to-one correspondence between segments and groups, the affiliation table 131 indicates affiliation of data to group. The affiliation table 131 is an example of grouping information of the first embodiment. The affiliation table 131 is stored in the management information storage unit 130. The affiliation table 131 includes columns for data and segment.

Data identification information is registered in the data column. Identification information of segment having data stored therein is registered in the segment column. For example, the affiliation table 131 has registered therein information of a data set "A" and segment identification information "SG11". The information indicates that the data set A is stored in the segment SG11. In addition, the segment SG11, corresponding to the group G11, indicates that the data set A belongs to the group G11.

The affiliation table 131 also has registered therein information that a data set B is stored in the segment SG12, data sets C and D are stored in the segment SG13, and data sets E, F and G are stored in the segment SG14. The affiliation table 131 also has registered therein correspondence between other data sets and segments.

Figure 7:
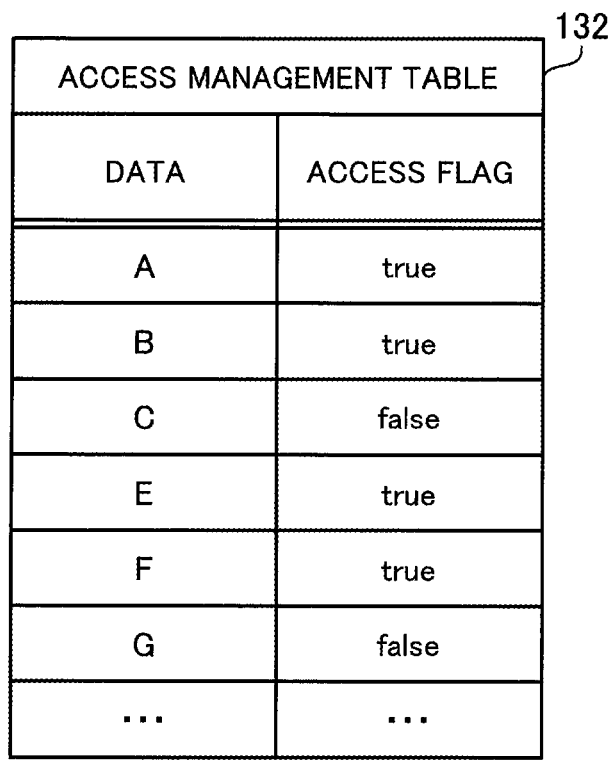
FIG. 7 illustrates an exemplary access management table in the second embodiment.

FIG. 7 illustrates an exemplary access management table in the second embodiment. An access management table 132 is information for managing whether or not there has been an access request to a data set held in the cache 110. The access management table 132 is stored in the management information storage unit 130. The access management table 132 includes columns for data and access flag.

Data identification information is registered in the data column. In the access-flag column, "true" indicating that there has been an access request, or "false" indicating that there has not been an access request is registered. For example, the access management table 132 has registered therein information that the data set is "A" and the access flag is "true". The information indicates that there has been an access to the data set A while the data set A is held in the cache 110.

In addition, the access management table 132 is used for group division, as will be described below. It suffices that the access management table 132 has registered therein information of data sets held in the cache 110. Therefore, after a certain group is divided, the controller 150 deletes, from the access management table 132, the entry of each data set belonging to the divided group.

Figure 8:
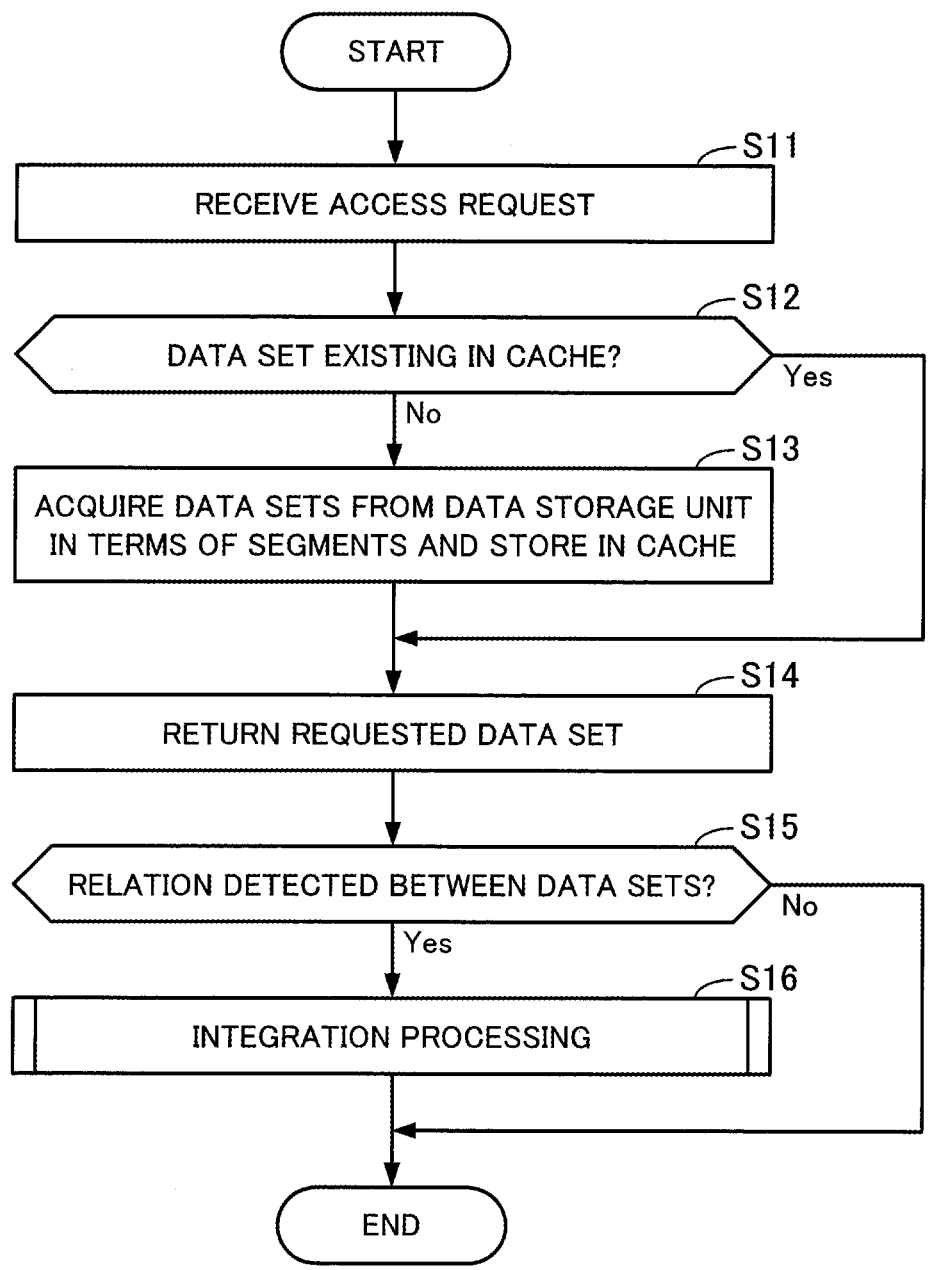
FIG. 8 is a flowchart illustrating an exemplary procedure of access processing in the second embodiment.

FIG. 8 is a flowchart illustrating an exemplary procedure of access processing in the second embodiment. In the following, the procedure illustrated in FIG. 8 will be described along with step numbers.

(S11) The access unit 140 receives an access request to one of the data sets from the client 200.

(S12) The access unit 140 determines whether or not the requested data set exists in the cache 110. When the requested data set exists, the access unit 140 acquires the requested data set from the cache 110, and advances the process flow to step S14. When the requested data set does not exist, the process flow proceeds to step S13. The access unit 140 documents which data set exists in which storage area of the cache 110 in the memory loading information of the management information storage unit 130 each time a data set is stored in the cache 110. The access unit 140 may perform the determination at step S12 by referring to the memory loading information.

(S13) The access unit 140 identifies the segment to which the requested data set belongs, referring to the affiliation table 131. The access unit 140 acquires each data set included in the identified segment in the data storage unit 120. The access unit 140 copies each of the acquired data sets and stores it in the cache 110. The access unit 140 registers the entry of the data set stored in the cache 110 in the access management table 132 (setting value of the access flag is set to "false").

(S14) The access unit 140 returns the requested data set to the client 200. The access unit 140 sets "true" to the access flag of the returned data set, referring to the access management table 132. However, nothing needs to be done when "true" has already been set.

(S15) The access unit 140 determines whether or not a relation between data sets has been detected. When a relation has been detected, the access unit 140 notifies the controller 150 of the data sets having a relation detected therebetween, and advances the process flow to step S16. When no relation has been detected, the processing terminates. Specifically, when two data sets have been sequentially accessed within a predetermined time-out period, the access unit 140 detects a "sequentially accessed" relation between the data sets.

(S16) The controller 150 performs integration processing of segments. Specifically, the controller 150 updates a segment in the data storage unit 120, based on updating of a group to which data sets belong and the updated group. The processing then terminates.

Figure 9:
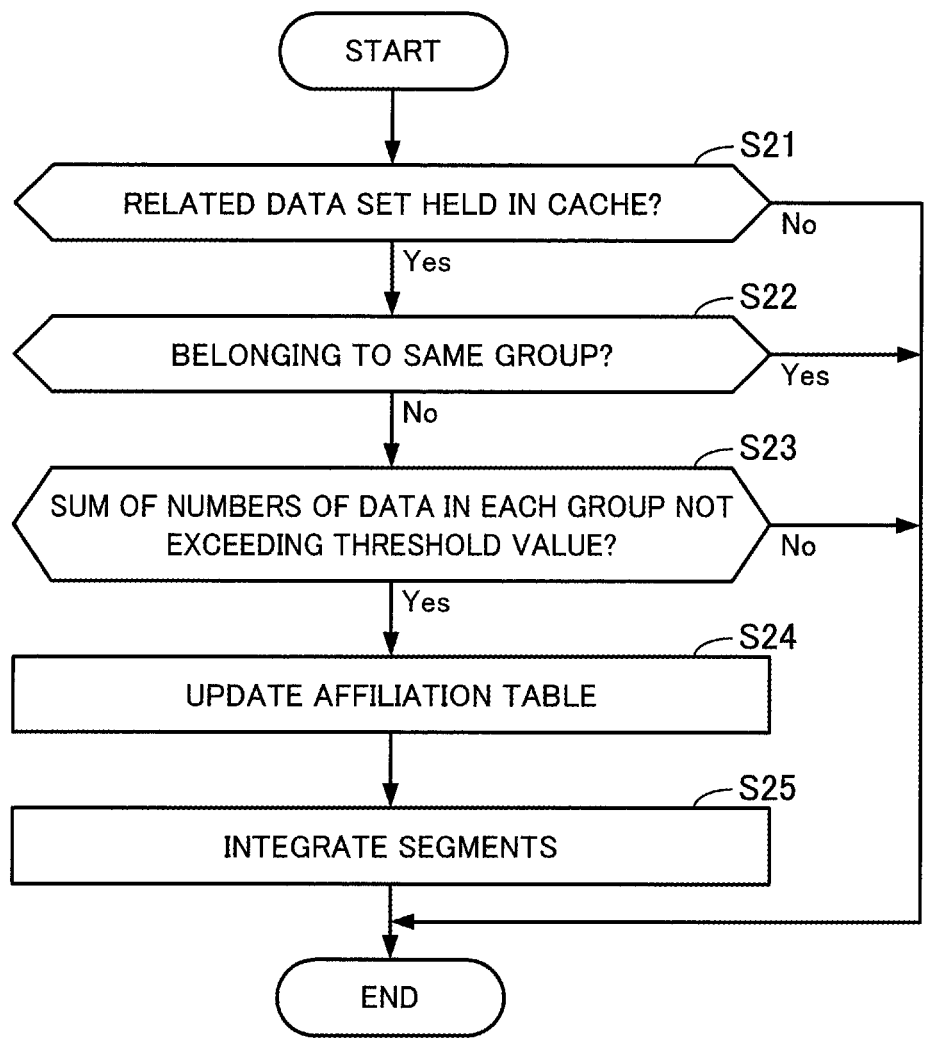
FIG. 9 is a flowchart illustrating an exemplary procedure of integration processing in the second embodiment.

FIG. 9 is a flowchart illustrating an exemplary procedure of integration processing in the second embodiment. In the following, the procedure illustrated in FIG. 9 will be described along with step numbers. The procedure illustrated in FIG. 9 corresponds to the process at step S16.

(S21) The controller 150 determines whether or not a data set for which a relation to the data set accessed this time has been detected (referred to as a related data set) is held in the cache 110. When the data set is held therein, the process flow proceeds to step S22. When no data set is held therein, the processing terminates. A related data set is a data set accessed earlier than the data set accessed this time. For example, when the server 100 has received a large number of access requests between the access request to the related data set and the current access request, allocation of storage area in the cache 110 to the related data set may be released. Therefore, the determination at step S21 is performed to confirm that the allocation of cache area to the related data set is not released.

(S22) The controller 150 determines whether or not the data set accessed this time and the related data set belong to the same group. When they belong to the same group, the processing terminates. When they do not belong to the same group, the process flow proceeds to step S23.

(S23) The controller 150 determines, based on the affiliation table 131, whether or not the sum of the number of data sets in the group to which the data set accessed this time belongs and the number of data sets in the group to which the related data set belongs does not exceed a threshold value of the number of data sets. When the sum does not exceed the threshold value, the process flow proceeds to step S24. When the sum exceeds the threshold value, the processing terminates.

(S24) The controller 150 updates the affiliation table 131. Specifically, the controller 150 causes all the data sets belonging to the group (segment) of the data set accessed this time and all the data sets belonging to the group (segment) of the related data set to belong to a new group (group integration). At step S24, the controller 150 only updates the affiliation table 131, and does not reflect the result of updating in the segment.

(S25) The controller 150 reflects the result of updating at step S24 in the segment. For example, when integrating the segments SG11 and SG12 into a single segment, a new segment to which the data sets A and B belong is created in the data storage unit 120 (segment integration). Upon creating a new segment, the controller 150 provides the created segment with identification information. In addition, the controller 150 releases the area of the original segments SG11 and SG12, and manages the area as an overwritable area.

The controller 150 may perform the process of step S25 after having updated the affiliation table 131 at step S24 a plurality of times. Alternatively, it is conceivable to perform the process of step S25 regularly at a predetermined time interval. In addition, at step S25, the newly created segment may be provided with identification information of either the segment SG11 or SG12 before integration.

Figure 10:
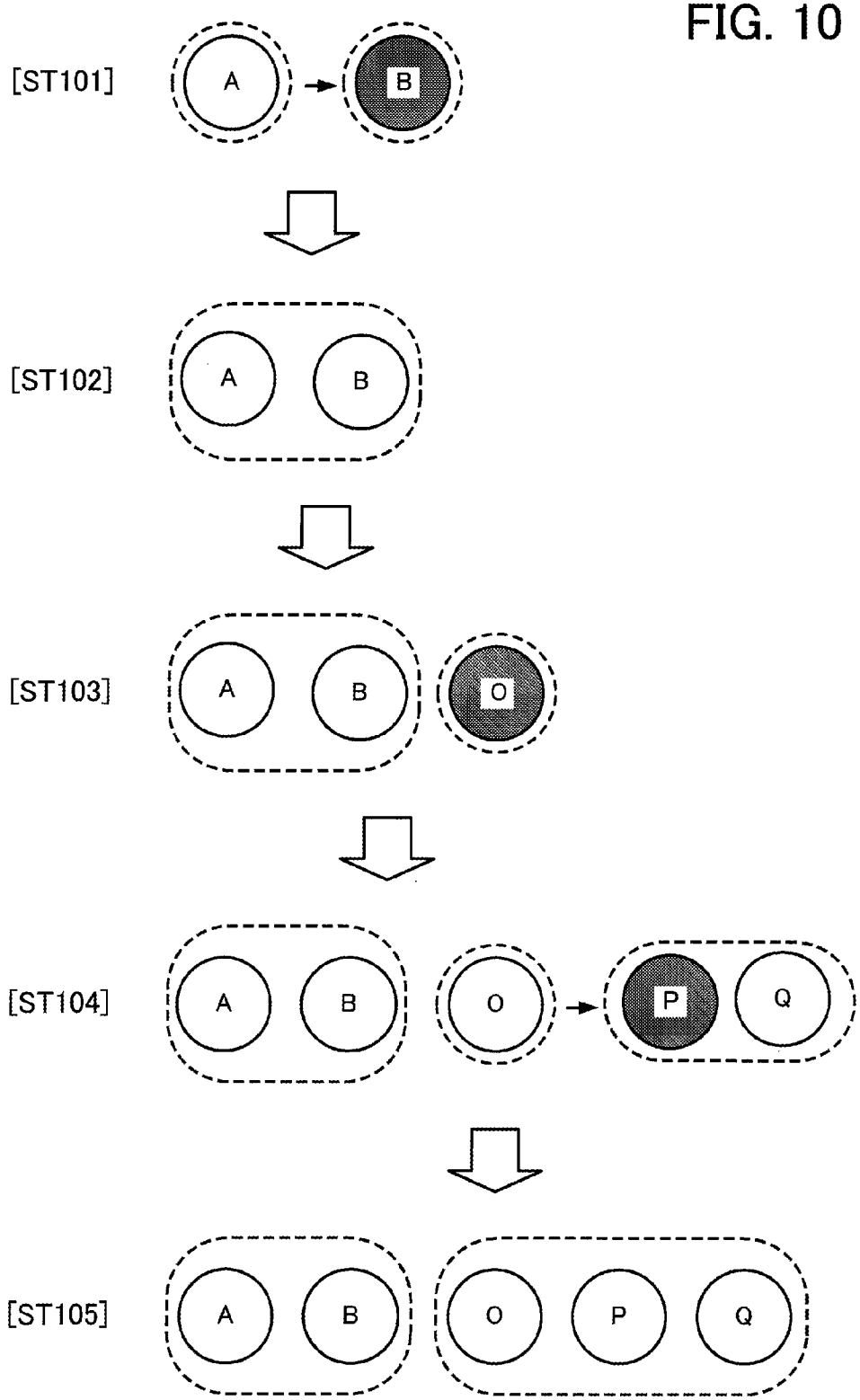
FIG. 10 illustrates a specific example of group integration of the second embodiment.

FIG. 10 illustrates a specific example of group integration of the second embodiment. In the following, the procedure illustrated in FIG. 10 will be described along with step numbers. Here, the threshold value of the number of data sets is set to be "3". Furthermore, the data set A is stored in the cache 110 immediately before the following step ST101. In addition, it is assumed that the other data sets are not stored in the cache 110. However, the same goes for the case where data sets B, Q, P and Q described below are stored in the cache 110 immediately before step ST101.

(ST101) The server 100 receives an access request to a data set B from the client 200. The server 100 then stores the data set B in the cache 110. In addition, the server 100 returns the data set B to the client 200. At this point, the data sets A and B belong to different groups. The access request to the data set B has occurred within a predetermined time-out period from when the access request to the data set A was issued. Therefore, the server 100 detects that data sets A and B are related.

(ST102) Since the sum "1+1=2" of the number of data sets of both groups to which the data sets A and B belong is not more than "3" which is the threshold value of the number of data sets, the server 100 integrates the two groups. In other words, the two groups to which the data sets A and B respectively belong are updated to a single group to which the data sets A and B belong.

(ST103) The server 100 receives an access request to a data set O from the client 200. The server 100 then stores the data set O in the cache 110. In addition, the server 100 returns the data set O to the client 200. The group to which the data sets A and B belong is different from the group to which the data set O belongs. However, the access request to the data set O occurred after a predetermined time-out period has elapsed from when the access request to the data set B occurred. Therefore, without detecting any relation between the data set B and the data set O, the server 100 leaves them in different groups.

(ST104) The server 100 receives an access request to a data set P from the client 200. At this point, the data sets P and Q belong to the same group and are stored in the same segment. The server 100 then stores the data sets P and Q in the cache 110. As a result, the data set Q is read ahead. In addition, the access request to the data set P occurred within a predetermined time-out period from when the access request to the data set O was issued. Therefore, the server 100 detects that the data sets O and P are related.

(ST105) Since the sum "1+2=3" of the number of data sets in the group to which the data set O belongs and the number of data sets in the group to which the data sets P and Q belong is not more than "3" which is the threshold value of the number of data sets, the server 100 integrates the two groups. In other words, the group to which the data set O belongs and the group to which the data sets P and Q belong are updated into a single group to which the data sets O, P and Q belong. Accordingly, related data sets are put in the same group.

Figure 11:
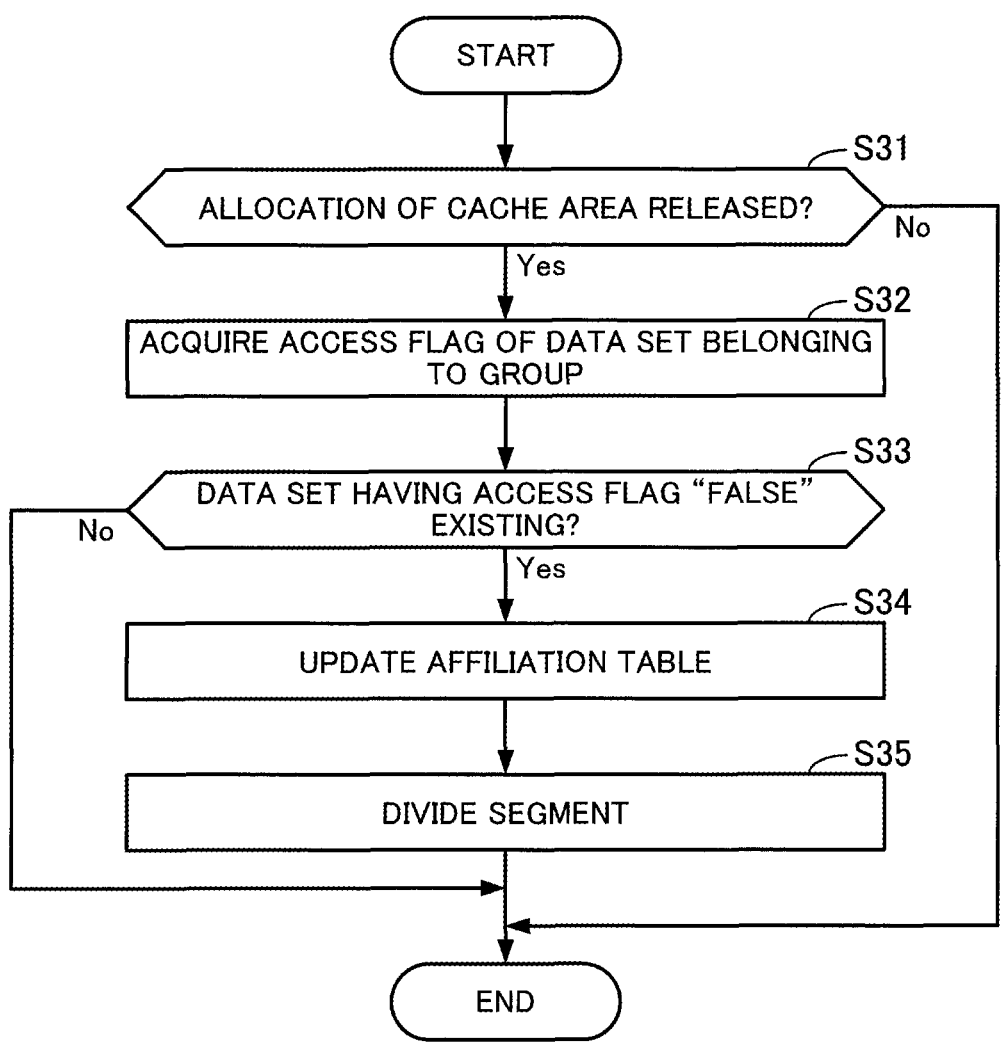
FIG. 11 is a flowchart illustrating an exemplary procedure of division processing in the second embodiment.

FIG. 11 is a flowchart illustrating an exemplary procedure of division processing in the second embodiment. In the following, the procedure illustrated in FIG. 11 will be described along with step numbers.

(S31) The controller 150 determines whether or not allocation of storage area (cache area) in the cache 110 to one of the groups has been released. When the allocation of cache area to one of the groups has been released, the process flow proceeds to step S32. When the allocation of cache area to one of the groups has not been released, the processing terminates.

(S32) The controller 150 acquires access flags of all the data sets belonging to the group to which the allocation of cache area has been released, referring to the access management table 132.

(S33) The controller 150 determines whether or not there exists a data set whose access flag is "false". When there exists a data set whose access flag is "false", the process flow proceeds to step S34. When there exists no data set whose access flag is "false", the processing terminates.

(S34) The controller 150 updates the affiliation table 131. Specifically, the controller 150 causes the data sets whose access flags are "true" (accessed during the period being stored in the cache 110) and the data sets whose access flags are "false" (no access during the same period) to belong to different groups (segments) (group division). At step S34, the controller 150 only updates the affiliation table 131, and does not reflect the result of updating in the segment.

(S35) The controller 150 reflects the result of updating of the affiliation table 131 in the segment. For example, when dividing the segment SG14 including the data sets E, F and G into a segment storing the data sets E and F, and a segment storing the data set G, the new segments are created in the data storage unit 120 (segment division). When a new segment is created, the controller 150 provides the new segment with identification information. In addition, the controller 150 releases the area in the original segment SG14, and manages it as an overwritable area. Furthermore, the controller 150 deletes the entry of the data sets E, F and G from the access management table 132.

The controller 150 may perform the process of step S35 after having updated the affiliation table 131 at step S34 a plurality of times. Alternatively, it is conceivable to perform the process of step S35 regularly at a predetermined time interval.

In addition, the division of segment at step S35 may be regarded as, for example, a process of removing the data set G from the segment SG14. After the division, there may be newly provided identification information of the segment to which the data set G belongs, with the identification information of the segment to which the data sets E and F belong being "SG14".

Figure 12:
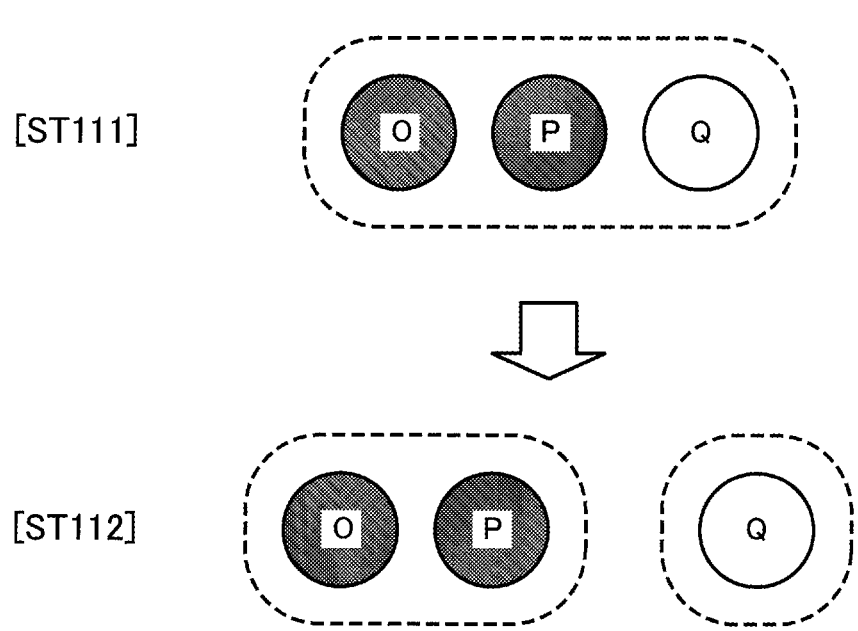
FIG. 12 illustrates a specific example of group division of the second embodiment.

FIG. 12 illustrates a specific example of group division of the second embodiment. In the following, the procedure illustrated in FIG. 12 will be described along with step numbers. Here, immediately before step ST111, the data sets O, P and Q are stored in the cache 110 and belong to the same group.

(ST111) While the data sets O, P and Q are being stored in the cache 110, the server 100 accepts access to the data sets O and P (access flag "true" is set to the data sets O and P). On the other hand, the server 100 does not accept access to the data set Q (access flag "false" is set to the data set Q) while the data sets O, P and Q are being stored in the cache 110. The server 100 releases the allocation of cache area to the group of the data sets O, P and Q.

(ST112) The server 100 causes the data sets O and P whose access flags are "true" to belong to one group, among the data sets O, P and Q, and causes the data set Q whose access flag is "false" to belong to another group, referring to the access management table 132.

As thus described, the server 100 excludes, from the group, the data set which has been read ahead together with other data sets but was not accessed while being stored in the cache 110. Next, a series of flow of integration or division of segments will be described.

Figure 13:
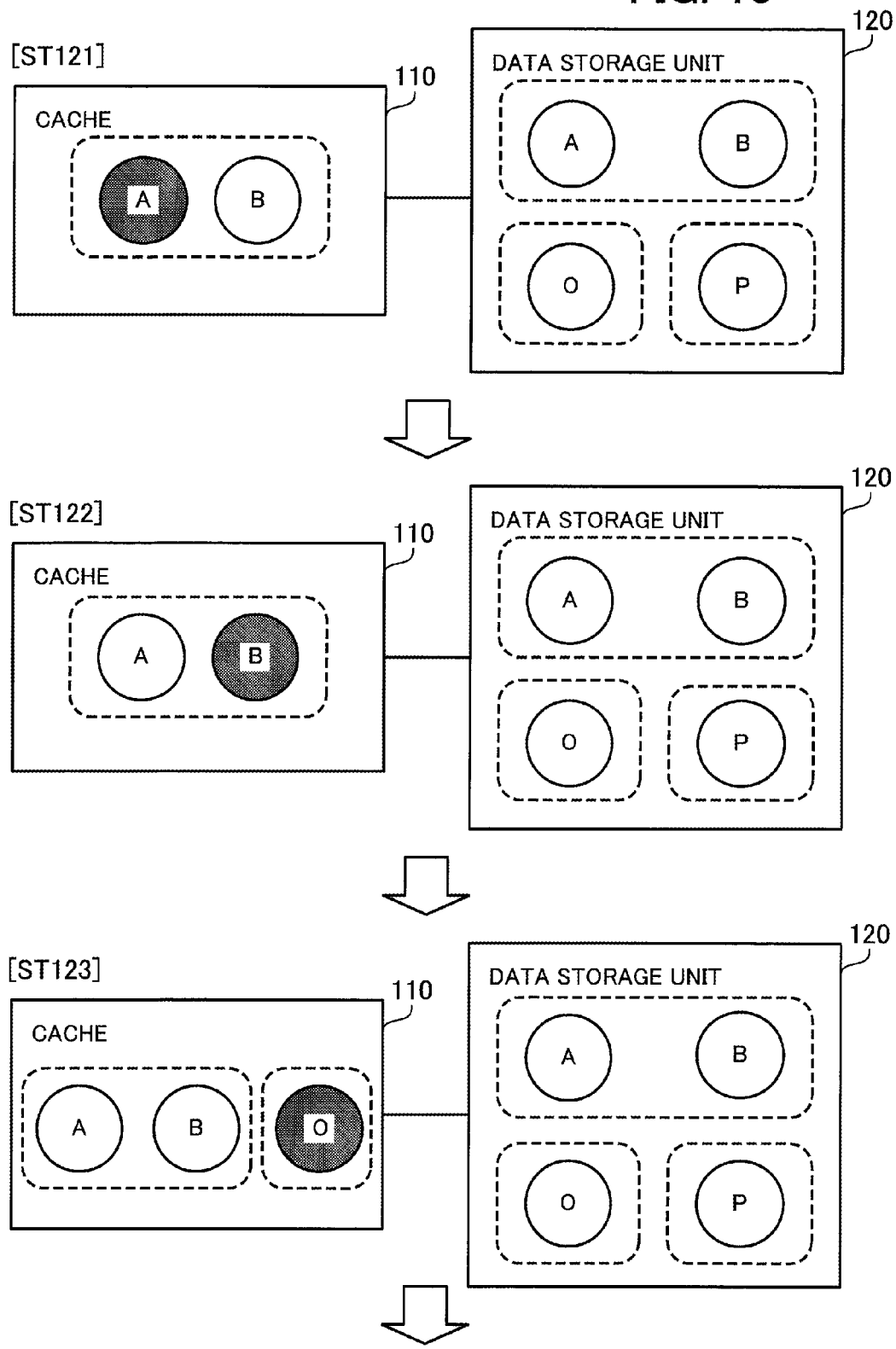
FIG. 13 illustrates a specific example of the processing in the second embodiment.

FIG. 13 illustrates a specific example of the processing in the second embodiment. In the following, the procedure illustrated in FIG. 13 will be described along with step numbers. Immediately before step ST121 illustrated in the following, the data sets A and B are stored in a segment of the data storage unit 120. In addition, the data set O is stored in a different segment from that of the data sets A and B. The data set P is stored in a different segment from those of the data sets A, B and O. Immediately before step ST121, it is assumed that none of the data sets are stored in the cache 110. Furthermore, the threshold value of the number of data sets is assumed to be "2" and the number of data sets storable in the cache 110 is assumed to be "3", as an example here.

(ST121) The server 100 receives an access request to the data set A from the client 200. The server 100 reads the data sets A and B from the data storage unit 120 and stores them in the cache 110. The server 100 transmits the data set A to the client 200.

(ST122) The server 100 receives an access request to the data set B from the client 200. The server 100 reads the data set B from the cache 110 and transmits it to the client 200. Since the data sets A and B already belong to the same group, the server 100 does not perform group integration even when a relation between the data sets A and B is detected.

(ST123) The server 100 receives an access request to the data set O from the client 200. The server 100 reads the data set O from the data storage unit 120 and stores it in the cache 110. The server 100 transmits the data set O to the client 200. Here, the server 100 detects the relation between the data sets B and O. However, the server 100 does not perform group integration since the sum "2+1=3" of the number of data sets in the group to which the data sets A and B belong and the number of data sets in the group to which the data set O belongs exceeds the threshold value "2" of the number of data sets per group.

Figure 14:
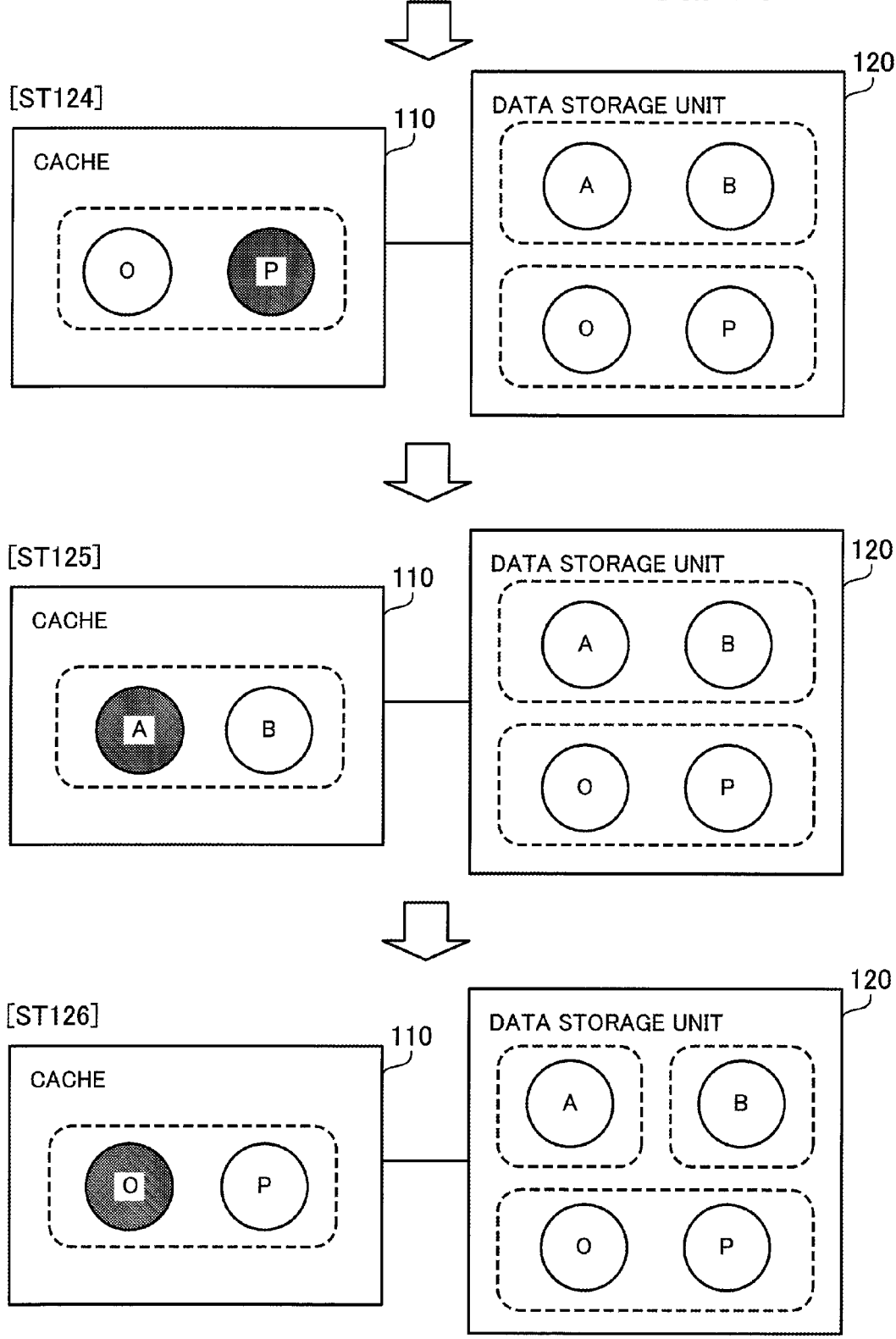
FIG. 14 illustrates a specific example (continued) of the processing in the second embodiment.

FIG. 14 illustrates a specific example (continued) of the processing in the second embodiment. In the following, the procedure illustrated in FIG. 14 will be described along with step numbers.

(ST124) The server 100 receives an access request to the data set P from the client 200. The server 100 reads the data set P from the data storage unit 120 and stores it in the cache 110. The server 100 transmits the data set P to the client 200. Storing the data sets A, B, O and P in the cache 110 results in that the number of data sets exceeds the upper limit "3"

of the number of data sets storable in the cache 110. Therefore, the server 100 releases the allocation of cache area to the data sets A and B. The data sets A and B are accessed at steps ST121 and ST122. Therefore, the server 100 does not divide the group of the data sets A and B. In addition, the server 100 detects that the data sets O and P are sequentially accessed, and integrates the groups of the data sets O and P. The server 100 reflects the integration of the groups also in the segment of the data storage unit 120.

(ST125) The server 100 receives an access request to the data set A from the client 200. The server 100 reads the data sets A and B from the data storage unit 120 and stores them in the cache 110. The server 100 transmits the data set A to the client 200. By a similar reason to step ST124 (exceeding the upper limit of the number of data sets storable in the cache 110), the server 100 releases the allocation of cache area to the data sets O and P. The data sets O and P are accessed at steps ST123 and ST124. Therefore, the server 100 does not divide the group of the data sets O and P.

(ST126) The server 100 receives an access request to the data set O from the client 200. The server 100 reads the data sets O and P from the data storage unit 120 and stores them in the cache 110. The server 100 transmits the data set O to the client 200. By a similar reason to step ST124 (exceeding the upper limit of the number of data sets storable in the cache 110), the server 100 releases the allocation of cache area to data sets A and B. The data set A has been accessed at step ST125. On the other hand, although the data set B has been read ahead into the cache 110 at step ST125, it is not accessed after the read-ahead. Therefore, the server 100 performs group division so that the data sets A and B belong to different groups. The server 100 reflects the group division also in the segment of the data storage unit 120.

As thus described, the server 100 causes data sets having a relation detected therebetween to belong to the same group and updates the data arrangement in the segment. In addition, the server 100 excludes, from the group, the data set which has been read ahead together with other data sets but was not accessed while being stored in the cache 110 and updates the data arrangement in the segment. The server 100 performs segment integration or division repeatedly in the above manner. Although it is assumed in the above description that a threshold value of the number of data sets is provided for the segment size, a threshold value of the data size (e.g., an amount expressed by the number of bits or bytes) may be used in place of the threshold value of the number of data sets.

Figure 15:
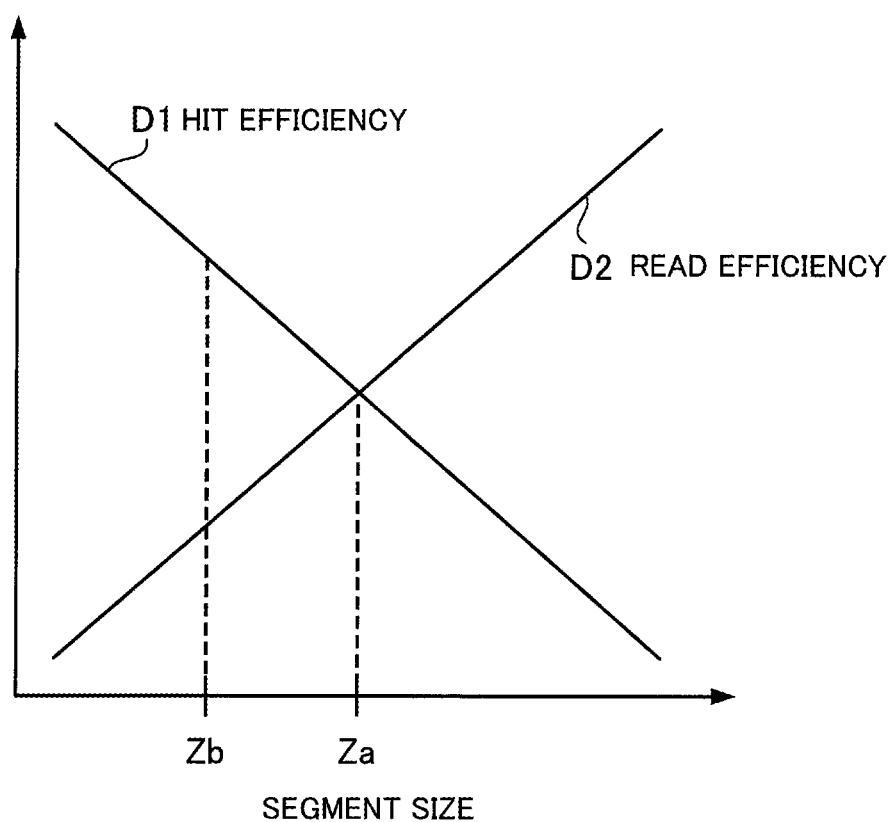
FIG. 15 illustrates an exemplary relation between segment size and hit efficiency/read efficiency.

FIG. 15 illustrates an exemplary relation between a segment size and a hit efficiency/read efficiency. The horizontal coordinate axis indicates the segment size. The vertical coordinate axis indicates the hit efficiency and the read efficiency. The segment size is the number of data sets stored in a segment. The hit efficiency is the possibility that the access-requested data set is stored in the cache 110 (cache hit rate). The higher the hit efficiency, the faster a data set may be accessed. The read efficiency is a read efficiency when reading data sets from the data storage unit 120 in terms of segments and storing them in the cache 110. The lower the access frequency to the data storage unit 120 when reading a data set, the higher the read efficiency becomes, which leads to faster access to data.

However, the storage capacity of the cache 110 is limited, and thus there is a trade off between the hit efficiency and the read efficiency. For example, the hit efficiency when reading data sets in terms of segments and storing them in the cache 110 may be improved by storing data sets which are more likely to be sequentially accessed in a segment of a smaller size (series D1 of hit efficiency). However, the smaller the segment size, the higher the access frequency to the data storage unit 120 becomes, whereby the read efficiency tends to decrease (series D2 of read efficiency).

On the other hand, since a large amount of data may be read ahead at a time by providing segments of a larger size, the read efficiency may be improved. However, the larger the segment size, the higher the possibility that data sets having less relation therebetween are arranged in the same segment becomes, whereby the hit efficiency tends to decrease.

With the relation illustrated in FIG. 15, it is conceivable that the segment size Za corresponding to the point where the series D1 and D2 intersect is the optimal segment size having a good balance between the hit efficiency and the read efficiency. However, the optimal segment size may vary according to the characteristics of access to data. For example, when a relatively small number of data sets are frequently accessed in order to perform a certain process, the frequency of allocating/releasing cache area for data sets decreases, and therefore the series D2 of read efficiency may shift more upward than in the case of FIG. 15. Alternatively, when a relatively larger number of data sets are accessed in order to perform a certain process, the frequency of allocating/releasing cache area to data sets increases, and therefore the series D2 of the read efficiency may shift more downward than in the case of FIG. 15.

Here, it is conceivable, for example, to fix the segment size to a certain size (e.g., segment size Zb). However, fixing the segment size makes it difficult to approach the optimal segment size according to the characteristics of access to data, as described above. Therefore, the server 100 increases the segment size of each segment until it reaches the threshold value of the segment size. In addition, the data set which has been read ahead together with other data sets but was not accessed while being stored in the cache 110 is excluded from the segment to reduce the segment size. Accordingly, the segment size of each segment may be adjusted according to the current access status.

Furthermore, setting a threshold value on the number of data sets belonging to a group (i.e., segment size) prevents the segment size from growing infinitely large, whereby the hit efficiency is prevented from significantly decreasing.

In addition, it is conceivable, for example, to hold the past access history to each data set in its entirety in order to manage the relationship between data sets. This is because the larger amount of access history information used for grouping allows grouping with statistically higher reliability to be performed. However, keeping the entire access history results in an increased amount of access history information over time, which may lead to an increased usage of memory. In addition, as the amount of access history information increases, the processing cost of analyzing the relationship between data sets increases. On the other hand, it is also conceivable to store the access history over a certain period only in order to save the usage of memory. In this case, however, access history information over other periods is lost and therefore the precision of grouping may decrease.

In contrast, the server 100 only needs to manage the access status for the data sets stored in the cache 110 in order to update the segment. Therefore, the server 100 need not hold the entire access history for all the data sets, whereby the amount of accumulated information may be suppressed. In addition, since the relation between data sets is updated at the timing when the relationship between data sets is detected, there is no need to process a large amount of information at a time such as when analyzing the entire access history. Therefore, the amount of computation by the server 100 along with the change of data arrangement in the data storage unit 120 may be suppressed.

Third Embodiment

Next, a third embodiment will be described. Mainly the difference from the aforementioned second embodiment will be described, with description of common matters omitted.

It is assumed in the second embodiment that a predetermined value is provided as the threshold value of the number of data sets (or data size) in a segment. In contrast, the third embodiment provides a function of making the threshold value variable for each group. This is because adjustment of segment size may be performed more flexibly.

Here, the information processing system of the third embodiment is similar to that of the second embodiment illustrated in FIG. 2. In addition, the devices and functions included in the information processing system of the third embodiment are similar to those of the second embodiment illustrated in FIGS. 3 and 4. Therefore, the same reference numerals and names as the second embodiment will be used in the third embodiment. However, the server 100 further stores a threshold value table.

Figure 16:
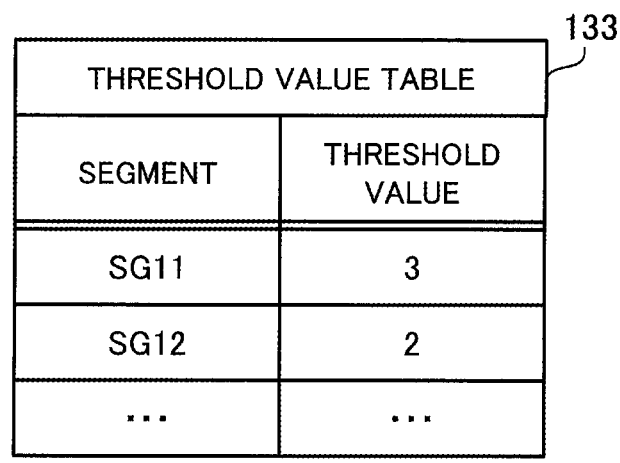
FIG. 16 illustrates an exemplary threshold value table in a third embodiment.

FIG. 16 illustrates an exemplary threshold value table in the third embodiment. A threshold value table 133 is stored in the management information storage unit 130. The threshold value table 133 includes columns for segment and threshold value.

The segment column has registered therein identification information of segments. The threshold value column has registered therein threshold values of the number of data sets in segments.

For example, the threshold value table 133 has registered therein information indicating a segment "SG11" and a threshold value "3". The information indicates that the upper limit of the number of data sets storable in the segment SG11 is "3".

Next, a processing procedure of the server 100 of the third embodiment will be described. Here, a procedure of access processing of the third embodiment is similar to that described in FIG. 8.

Figure 17:
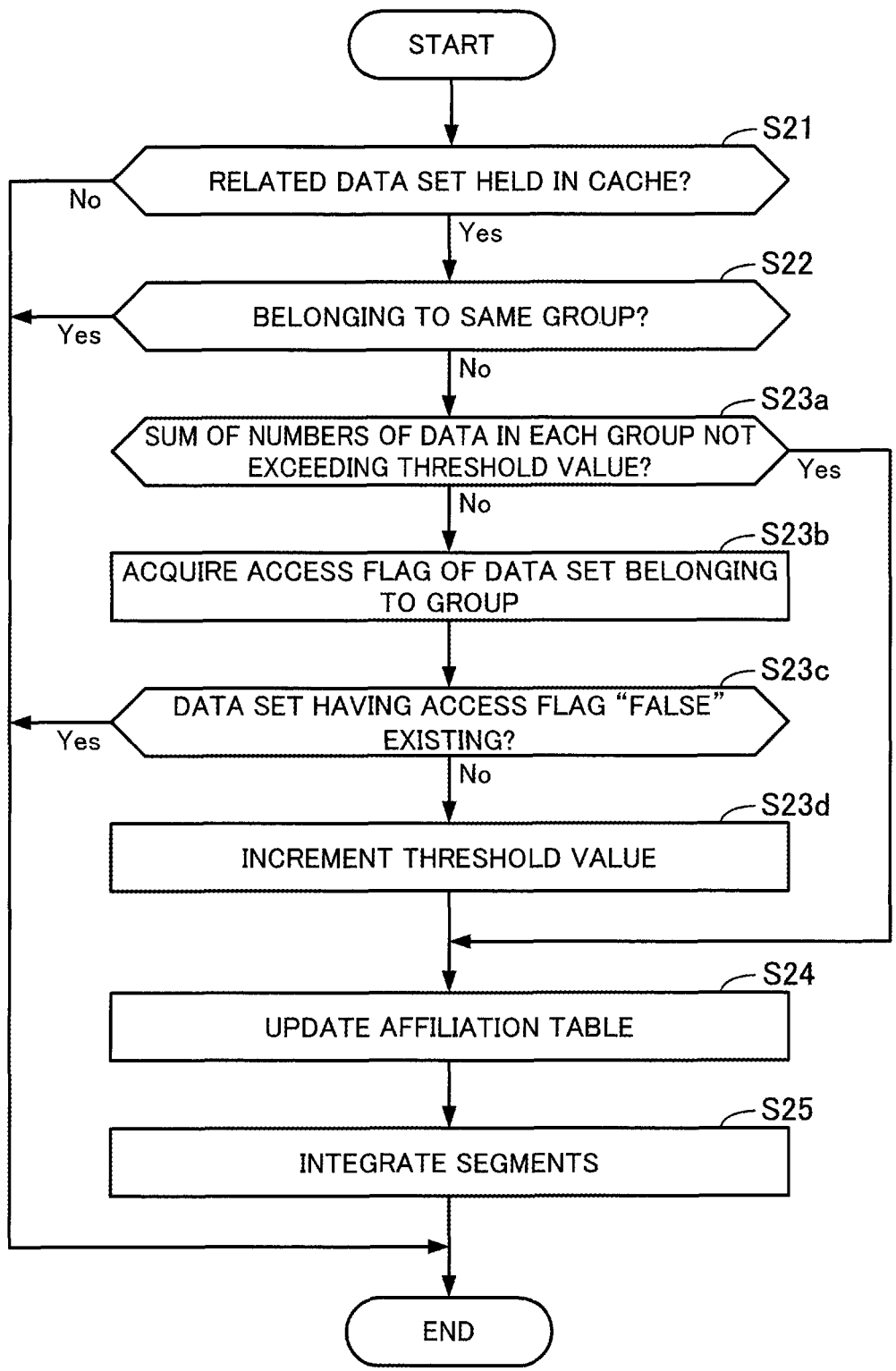
FIG. 17 is a flowchart illustrating an exemplary procedure of integration processing of the third embodiment.

FIG. 17 is a flowchart illustrating an exemplary procedure of integration processing of the third embodiment. In the following, the procedure illustrated in FIG. 17 will be described along with step numbers. Here, the procedure of FIG. 17 is performed in place of the procedure of FIG. 9. The procedure of FIG. 17 differs in that steps S23a, S23b, S23c and S23d are performed in place of step S23 of FIG. 9. Therefore, these steps are mainly described, with description of other steps being omitted.

(S23a) The controller 150 determines, based on the affiliation table 131 and the threshold value table 133, whether or not the sum of the number of data sets in the group to which the data set accessed this time belong, and the number of data sets in the group to which the related data set belongs does not exceed the threshold value of the number of data sets. When the sum does not exceed the threshold value, the process flow proceeds to step S24. When the sum exceeds the threshold value, the process flow proceeds to step S23b. Here, the threshold value of the number of data sets referred to is the threshold value corresponding to the group to which the data set accessed this time belong, in the threshold value table 133.

(S23b) The controller 150 acquires the access flag of each data set belonging to the group of the data set accessed this time, referring to the access management table 132.

(S23c) The controller 150 determines whether or not there exists a data set whose access flag is "false". When there exists such a data set, the processing terminates. When there exists no such data set, the process flow proceeds to step S23d.

(S23d) The controller 150 increments the threshold value of the group accessed this time, referring to the threshold value table 133. Specifically, the number of data sets in the group to which the related data set belongs is added to the threshold value of the group accessed this time. The process flow then proceeds to step S24. The controller 150 registers, in the threshold value table 133, the correspondence between the identification information of the created segment and the threshold value newly determined at step S23d, when creating identification information of a new segment in the process of step S24.

As thus described, even when the threshold value of the number of data sets is exceeded by group integration, data sets considered to have a relation therebetween may be caused to belong to the same group by incrementing the threshold value of the number of data sets. In the example of FIG. 15, it becomes difficult to approach the segment size Za when the threshold value of the segment size is smaller than the segment size Za. Therefore, the segment size Za may be realized by making the threshold value updatable as described above.

In addition, as indicated at step S23c, it is a requirement that access flags of all the data sets included in the group of the data set accessed this time are "true". Accordingly, it is possible to control so as to increment the threshold value for a group including only data sets assumed to have a strong relationship therebetween. This is because infinitely incrementing the threshold value for a group including data sets considered to have a weak relationship with other data sets, may lead to decreased hit efficiency.

Fourth Embodiment

Next, a fourth embodiment will be described. Mainly the difference from the aforementioned second embodiment will be described, with description of common matters omitted.

It is assumed in the second embodiment that whether or not to integrate groups is determined each time a relation is detected between data sets. In contrast, the fourth embodiment achieves improvement in precision of grouping by performing group integration at the timing when relation is detected between respective data sets a plurality of times.

Here, the information processing system of the fourth embodiment is similar to that of the second embodiment illustrated in FIG. 2. In addition, the devices and functions included in the information processing system of the fourth embodiment are similar to those of the second embodiment illustrated in FIGS. 3 and 4. Therefore, the same reference numerals and names as the second embodiment will be used in the fourth embodiment. However, the server 100 further stores a detection count table.

Figure 18:
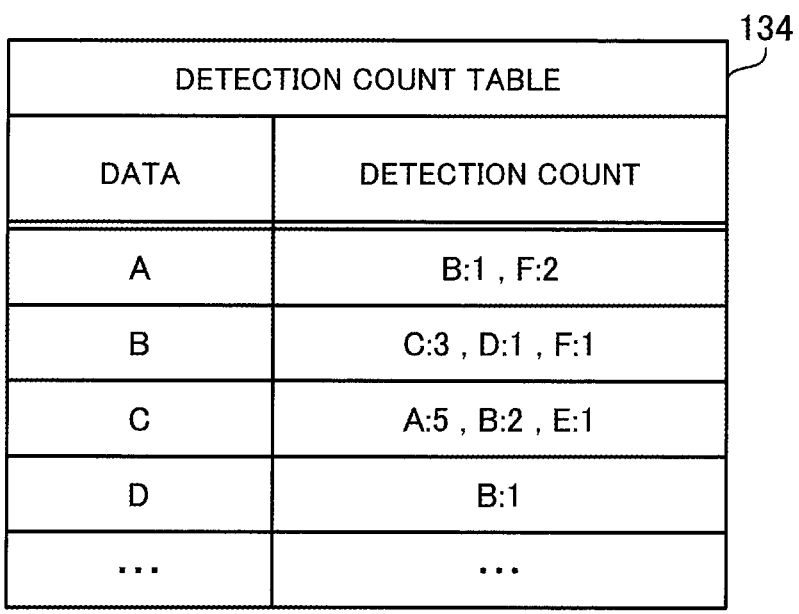
FIG. 18 illustrates an exemplary detection count table in a fourth embodiment.

FIG. 18 illustrates an exemplary detection count table in the fourth embodiment. A detection count table 134 is stored in the management information storage unit 130. The detection count table 134 includes columns for data set and detection count. The data set column has registered therein data names. The detection count column has registered therein the number of times a relation to a related data set has been detected.

For example, the detection count table 134 has registered therein information indicating a data set "A" and a detection count "B:1, F:2". The information indicates that the number of times a relation of the data set A to the data set B (sequentially accessed in the order of data sets B and A) has been detected is one. In addition, the information indicates that the number of times a relation of the data set A to the data set F (sequentially accessed in the order of data sets F and A) has been detected is two.

The detection count table 134, which is information having recorded therein the number of times a relation has been detected, may be considered as exemplary relationship information. Next, a processing procedure of the server 100 of the fourth embodiment will be described. Here, the procedure of access processing of the fourth embodiment is similar to that described in FIG. 8.

Figure 19:
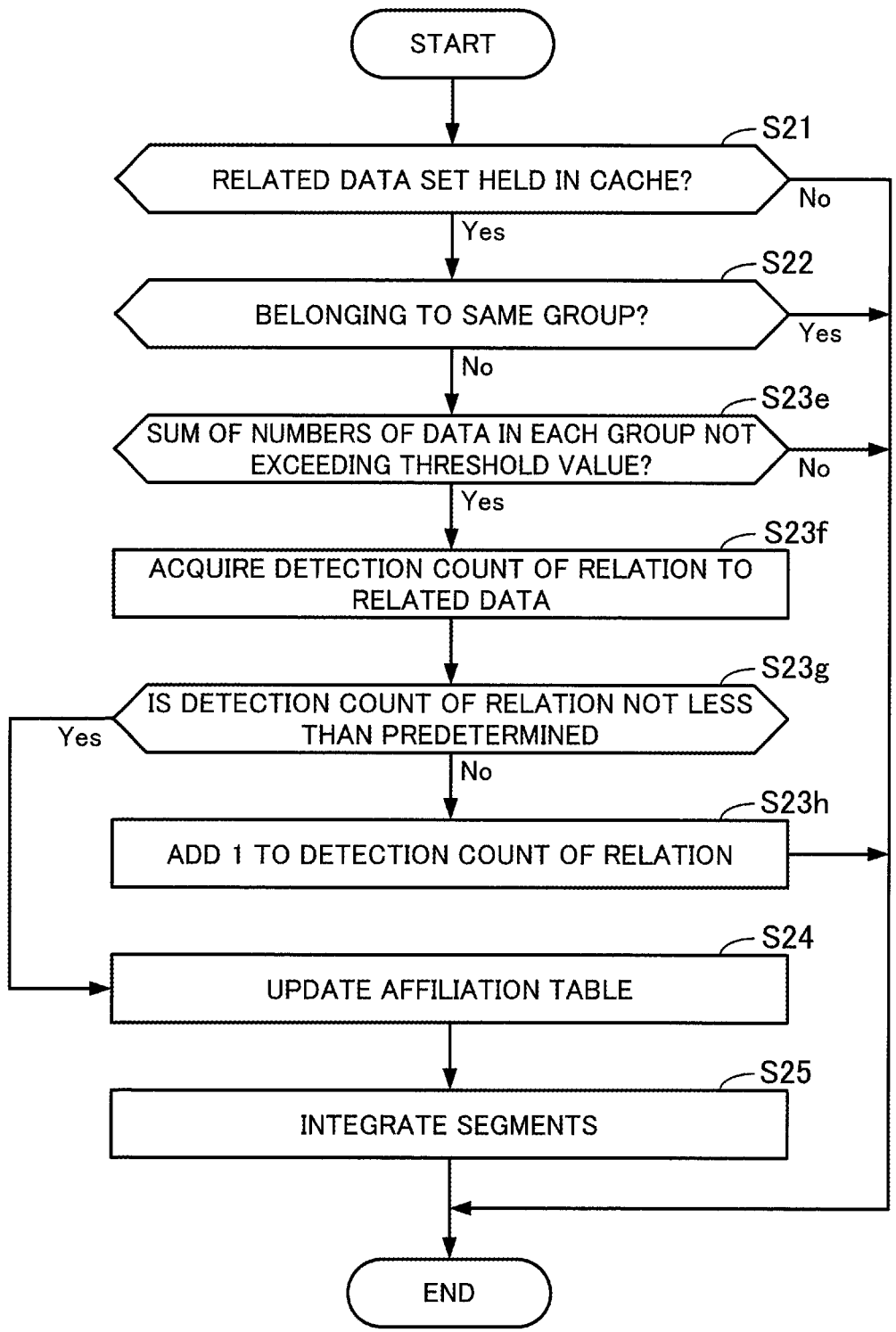
FIG. 19 is a flowchart illustrating an exemplary procedure of integration processing of the fourth embodiment.

FIG. 19 is a flowchart illustrating an exemplary procedure of integration processing of the fourth embodiment. In the following, the procedure illustrated in FIG. 19 will be described along with step numbers. Here, the procedure of FIG. 19 is performed in place of the procedure of FIG. 9. The procedure of FIG. 19 differs in that steps S23e, S23f, S23g and S23h are performed in place of step S23 of FIG. 9. Therefore, these steps are mainly described, with description of other steps being omitted.

(S23e) The controller 150 determines, based on the affiliation table 131, whether or not the sum of the number of data sets in the group to which the data set accessed this time belongs, and the number of data sets in the group to which the related data set belongs does not exceed the threshold value of the number of data sets. When the sum does not exceed the threshold value, the process flow proceeds to step S23f. When the sum exceeds the threshold value, the processing terminates.

(S23f) The controller 150 acquires the detection count of the data set related to the data set accessed this time, referring to the detection count table 134.

(S23g) The controller 150 determines whether or not the detection count is not less than a predetermined count. When the detection count is not less than the predetermined count, the controller 150 deletes, for the data set accessed this time, the entry of the detection count of the related data set whose detection count is not less than a predetermined count, and advances the process flow to step S24. When the detection count is less than the predetermined count, the process flow proceeds to step S23h. Any count may be set for use in the determination, according to the operation environment. For example, a value such as three, five, or ten may be preliminarily set in the management information storage unit 130.

(S23h) The controller 150 adds "1" to the detection count of the data set detected as being related to the data set accessed this time, referring to the detection count table 134. When there is no entry of the detected related data set in the detection count table 134, the controller 150 adds an entry of the data set detected as being related to the data set accessed this time (set the initial value "1" of the detection count). The processing then terminates.

As thus described, integrating groups to which data sets having a relation detected therebetween more than a predetermined count belong makes it possible to cause data sets assumed to have stronger relationship to belong to the same group. Accordingly, the precision of grouping may be improved.

Fifth Embodiment

Next, a fifth embodiment will be described. Mainly the difference from the aforementioned second embodiment will be described, with description of common matters omitted.

It is assumed in the second embodiment that the determination of whether or not to perform group division is based on the presence or absence of access to each data set belonging to the group. In contrast, the fifth embodiment may achieve improvement in the precision of grouping by performing group division according to the access count to each data set.

Here, the information processing system of the fifth embodiment is similar to that of the second embodiment illustrated in FIG. 2. In addition, the devices and functions included in the information processing system of the fifth embodiment are similar to those of the second embodiment illustrated in FIGS. 3 and 4. Therefore, the same reference numerals and names as the second embodiment will be used in the fifth embodiment. However, the server 100 further stores an access count table.

FIG. 20 illustrates an exemplary access count table in the fifth embodiment. An access count table 135 is information having registered therein the number of times the access requests to respective data sets have been received. The access count table 135 is used in place of the access management table 132. The access count table 135 is stored in the management information storage unit 130. The access count table 135 includes columns for data set and access count.

The data set column has registered therein identification information of data sets. The access count column has registered therein an access count. The access count table 135 is preliminarily prepared with entries of data sets stored in the data storage unit 120. For example, the access count table 135 has registered therein information indicating a data set "A" and an access count "3". The information indicates that the number of access requests to the data set A has been three up to the present time from when the previous access count was reset.

Next, a processing procedure of the server 100 of the fifth embodiment will be described. Here, the procedure of access processing of the fifth embodiment is similar to that described in FIG. 8. However, at step S13, the access unit 140 need not perform the processing on the access management table 132. Additionally, in place of setting the access flag, at step S14, the access unit 140 adds "1" to the access count of the returned data set, referring to the access count table 135.

Figure 21:
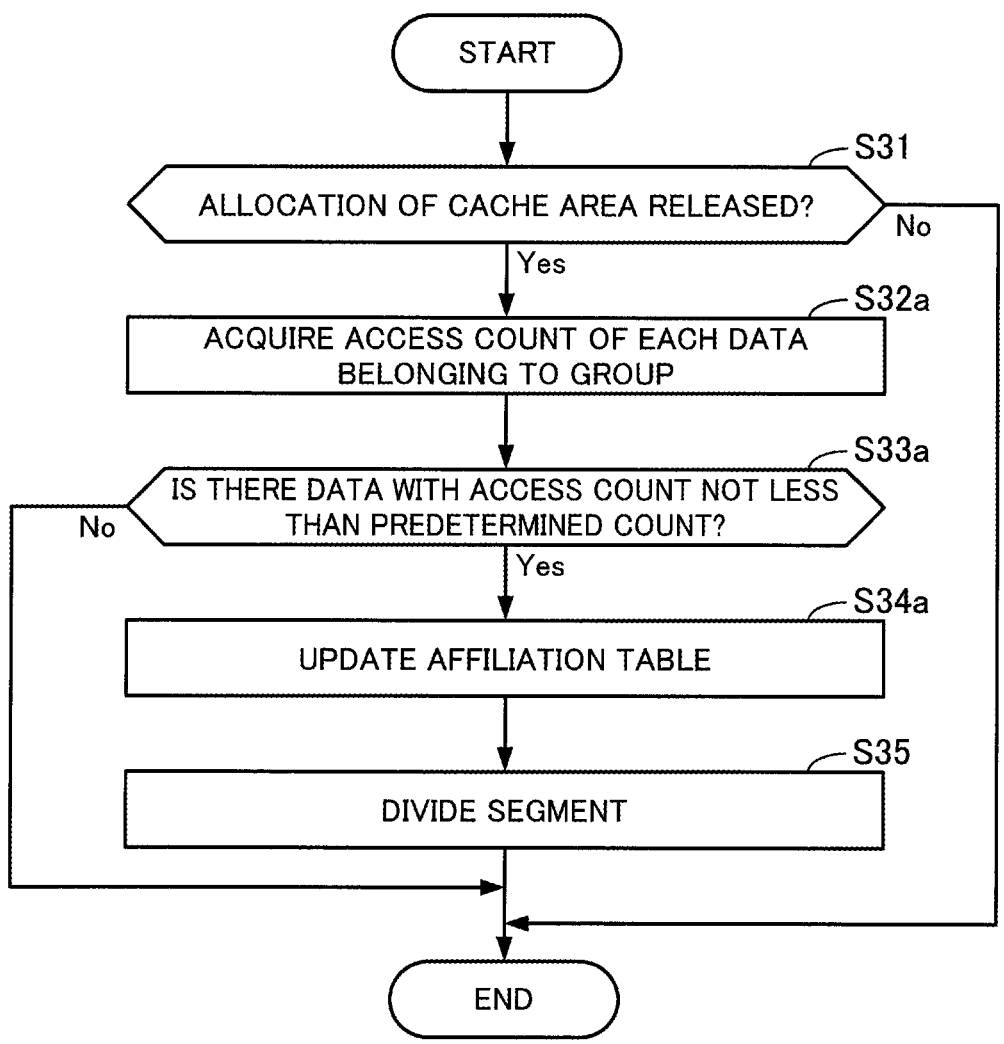
FIG. 21 is a flowchart illustrating an exemplary procedure of division processing of the fifth embodiment.

FIG. 21 is a flowchart illustrating an exemplary procedure of division processing of the fifth embodiment. In the following, the procedure illustrated in FIG. 21 will be described along with step numbers. Here, the procedure of FIG. 21 is performed in place of the procedure of FIG. 11. The procedure of FIG. 21 differs in that steps S32a, S33a and S34a are performed in place of steps S32, S33 and S34 of FIG. 11. Therefore, these steps are mainly described, with description of other steps being omitted.

(S32a) The controller 150 acquires the access count of each data set belonging to the group whose allocation of cache area has been released, referring to the access count table 135.

(S33a) The controller 150 determines whether or not there exists a data set whose access count is not less than a predetermined count. When there exists a data whose access count is not less than the predetermined count, the process flow proceeds to step S34a. When there exists no data set whose access count is not less than a predetermined count, the processing terminates. Any count may be set for use in the determination, according to the operation environment.

For example, a value such as three, five, or ten may be preliminarily set in the management information storage unit 130.

(S34*a*) The controller 150 updates the affiliation table 131. Specifically, the controller 150 causes data sets whose access count is other than "0" (accessed over a plurality of periods during which the data sets were stored in the cache 110) and data sets whose access count is "0" (no access during the same periods) in different groups (segments) (group division). The controller 150 resets the access count in the access count table 135 to "0" for the data sets whose group has been divided.

As thus described, determination of whether or not to divide a group is performed based on whether or not there exists a data set whose access count is not less than a predetermined count. This is because it is conceivable that, for example, when there exists a data set whose access count is "0" in the same group although there exists a data set which has been accessed for not less than a predetermined count, the relationship between both data sets has particularly weakened. Narrowing down data sets to be excluded from a group makes it possible to cause data sets estimated to have stronger relationship to belong to the same group. Accordingly, the precision of grouping may be improved.

Sixth Embodiment

Next, a sixth embodiment will be described. Mainly the difference from the aforementioned second to fourth embodiments will be described, with description of common matters omitted. Group integration may be performed by combining the functions illustrated in the second to fourth embodiments. Therefore, in the sixth embodiment, an exemplary case of combining the functions of the second to fourth embodiments is described.

Here, the information processing system of the sixth embodiment is similar to that of the second embodiment illustrated in FIG. 2. In addition, the devices and functions included in the information processing system of the sixth embodiment are similar to those of the second embodiment illustrated in FIGS. 3 and 4. Therefore, the same reference numerals and names as the second embodiment will be used in the sixth embodiment. However, the server 100 stores the threshold value table 133 described in FIG. 16 and the detection count table 134 described in FIG. 18. The procedure of access processing of the sixth embodiment is similar to the procedure of FIG. 8.

Figure 22:
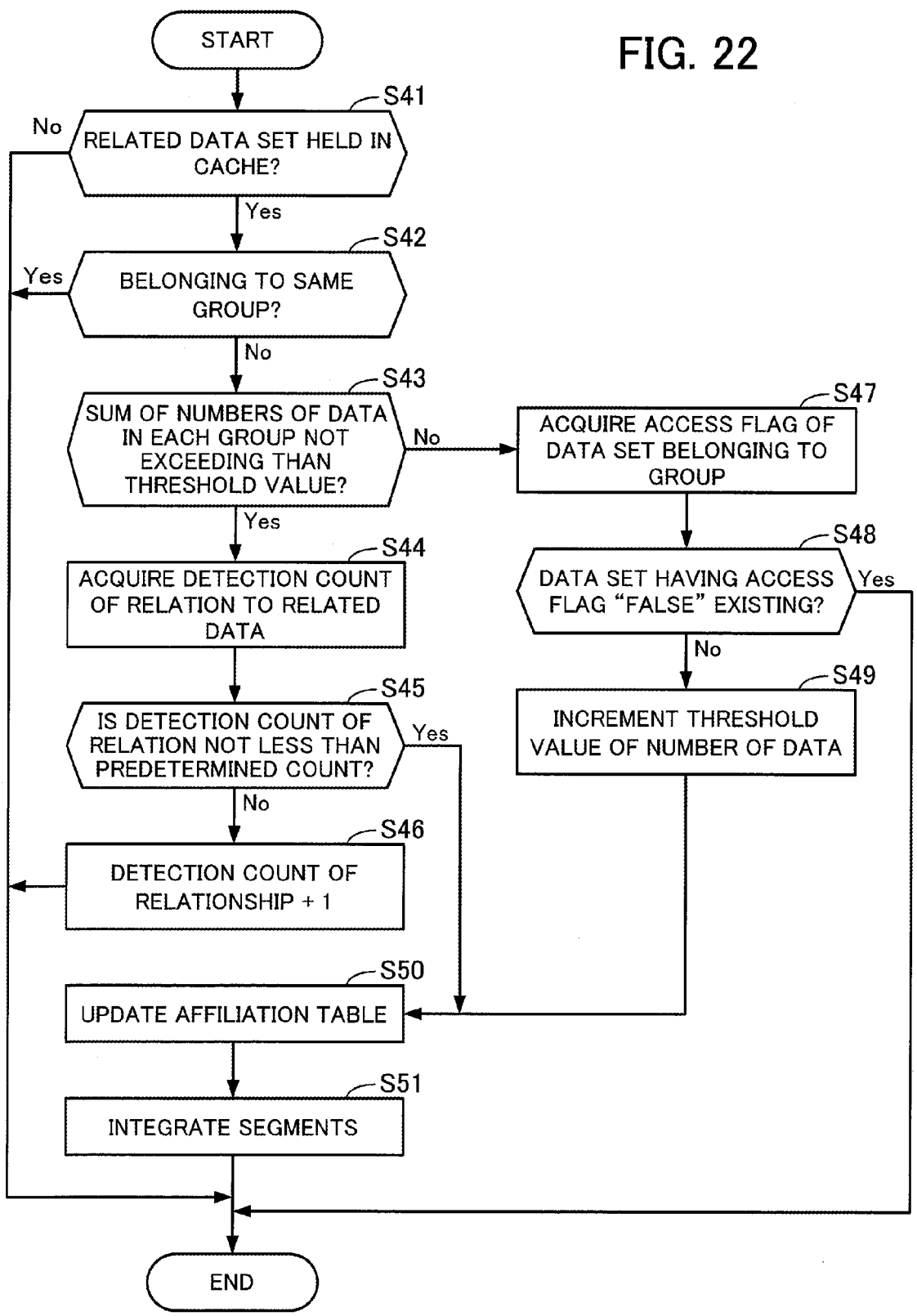
FIG. 22 is a flowchart illustrating an exemplary procedure of integration processing of a sixth embodiment.

FIG. 22 is a flowchart illustrating an exemplary procedure of the integration processing of the sixth embodiment. In the following, the procedure illustrated in FIG. 22 will be described along with step numbers. Here, the procedure of FIG. 22 is performed in place of the procedure of FIG. 9.

(S41) The controller 150 determines whether or not a related data set is held in the cache 110. When a related data set is held therein, the process flow proceeds to step S42. When no related data set is held therein, the processing terminates.

(S42) The controller 150 determines whether or not the data set accessed this time and the related data set belong to the same group. When they belong to the same group, the processing terminates. When they do not belong to the same group, the process flow proceeds to step S43.

(S43) The controller 150 determines, based on the affiliation table 131, whether or not the sum of the number of data sets in the group to which the data set accessed this time belongs and the number of data sets in the group to which the related data set belongs is not more than a threshold value of the number of data sets. When the sum is not more than the threshold value, the process flow proceeds to step S44. When the sum is more than the threshold value, the process flow proceeds to step S47.

(S44) The controller 150 acquires the detection count of the data set related to data set accessed this time, referring to the detection count table 134.

(S45) The controller 150 determines whether or not the detection count is not less than a predetermined count. When the detection count is not less than the predetermined count, the process flow proceeds to step S50. When the detection count is less than the predetermined count, the process flow proceeds to step S46. Any count may be set for use in the determination in step S45, according to the operation environment. For example, a value such as three, five, or ten may be preliminarily set in the management information storage unit 130.

(S46) The controller 150 adds "1" to the detection count of the data set detected as being related to the data set accessed this time, referring to the detection count table 134. When there is no entry of the detected related data set in the detection count table 134, the controller 150 adds an entry of the data set detected as being related to the data set accessed this time (set the initial value "1" of the detection count). The processing then terminates.

(S47) The controller 150 acquires the access flag of each data set belonging to the group of data set accessed this time, referring to the access management table 132.

(S48) The controller 150 determines whether or not there exists a data set whose access flag is "false". When there exists such a data set, the processing terminates. When there exists no such data set, the process flow proceeds to step S49.

(S49) The controller 150 increments the threshold value of the group, referring to the threshold value table 133. Specifically, the number of data sets in the group to which the related data set belongs is added to the threshold value of the group accessed this time. The process flow then proceeds to step S50.

(S50) The controller 150 updates the affiliation table 131. Specifically, the controller 150 causes all the data sets belonging to the group (segment) of the data set accessed this time and all the data sets belonging to the group (segment) of the related data set to belong to a new group (group integration). At step S50, the controller 150 only updates the affiliation table 131, and does not reflect the result of updating in the segment.

(S51) The controller 150 reflects the result of updating at step S50 in the segment. For example, when integrating the segments SG11 and SG12 into a single segment, a new segment to which the data sets A and B belong is created in the data storage unit 120 (segment integration). The controller 150 releases the area of the original segments SG11 and SG12, and manages the area as an overwritable area.

As thus described, the functions of the second to fourth embodiments may be combined. Accordingly, a similar effect to the second to fourth embodiments may be realized. It is also conceivable to add the function of the fifth embodiment. When the function of the fifth embodiment is added, the controller 150 is supposed to use the access count table 135 in place of the access management table 132. Accordingly, at step S47, the controller 150 acquires the access count from the access count table 135 for a data set belonging to a group of interest. At step S48, it is determined whether or not there exists a data set whose access count is "0", among the acquired access counts. When there exists no data set whose access count is "0", the process flow proceeds to step S49, whereas the processing terminates when there exists a data set whose access count is "0". As thus described, the function of the fifth embodiment may be added.

Seventh Embodiment

Next, a seventh embodiment will be described. Mainly the difference from the aforementioned second to sixth embodiments will be described, with description of common matters omitted.

It is assumed in the second to sixth embodiments that the server 100 is a node managing data sets. On the other hand, it is also conceivable to provide a plurality of nodes and manage each segment by the plurality of nodes in a distributed manner. This is because the load accompanied with data access by each node may be reduced, and also the speed of data access may be increased.

Figure 23:
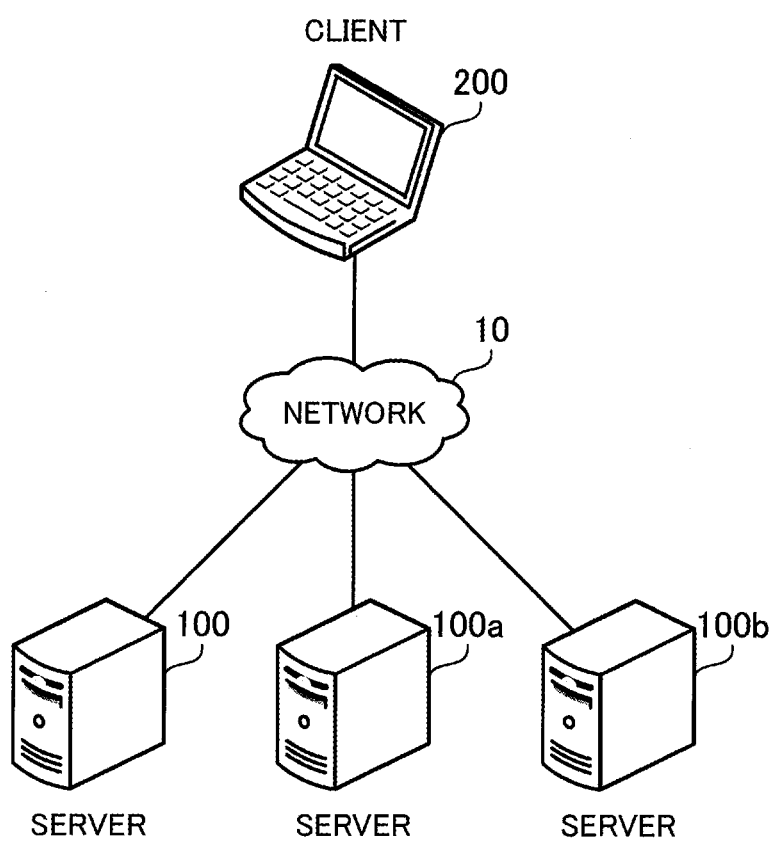
FIG. 23 illustrates an exemplary information processing system of a seventh embodiment.

FIG. 23 illustrates an exemplary information processing system of the seventh embodiment. The information processing system of the seventh embodiment includes, in addition to the server 100 described in the seventh embodiment, servers 100a and 100b. The servers 100a and 100b are connected to the network 10. The servers 100a and 100b are server computers provided with a similar function to the server 100.

The servers 100, 100a and 100b manage a plurality of segments in a distributed manner. For example, the server 100 is in charge of the segment SG1, the server 100a is in charge of the segment SG2, and the server 100b is in charge of the segment SG3. When an access request to a data set of any of the segments is received, a server in charge of the access-requested segment responses to the access request. For example, when the server 100b receives an access request to a data set of the segment SG1, the server 100b transfers the access request to the server 100. Upon receiving the transferred access request, the server 100 transmits the requested data set to the requestor.

Here, the servers 100a and 100b may be realized using similar hardware to the server 100. In addition, the function of the servers 100a and 100b are similar to the function of the server 100 described in FIG. 4. However, the controllers of respective servers communicate with each other, and synchronize the affiliation tables held in respective servers with the latest state. In addition, the servers 100, 100a and 100b hold the correspondence relation between segments and servers in charge.

Figure 24:
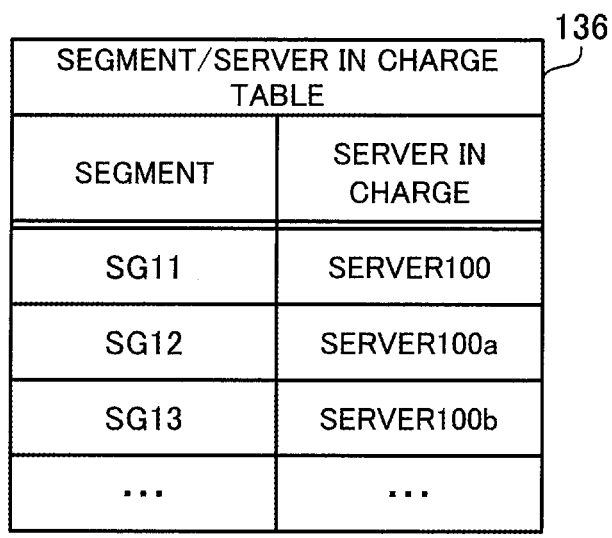
FIG. 24 illustrates an exemplary segment/server in charge table in the seventh embodiment.

FIG. 24 illustrates an exemplary segment/server in charge table in the seventh embodiment. A segment/server in charge table 136 is stored in the management information storage unit 130. The servers 100a and 100b also hold a similar table to the segment/server in charge table 136. The segment/server in charge table 136 includes columns for segment and server in charge.

The segment column has registered therein identification information segments. The server in charge column has registered therein identification information of servers handling segments. For example, the segment/server in charge table 136 has registered therein information indicating a segment "SG1" and a server in charge "server 100". The information indicates that the server 100 is in charge of the segment SG1.

Each server holds an affiliation table and a segment/server in charge table and is capable of grasping that which server is in charge of which segment. For example, the server 100 is capable of grasping that a data set belonging to which segment may be acquired from which server, based on the affiliation table 131 and the segment/server in charge table 136.

For example, it is conceivable to determine which server is in charge of which segment, based on the identification information or the like of the segment. Therefore, also when creating a new segment along with integration or division of groups, each server provides the new segment identification information to be capable of grasping to which server a data set to be stored in the new segment is supposed to be transmitted. For example, each server is also capable of instructing other servers to create a new segment, as well as transmitting a data set to be stored in the new segment to other servers. In addition, along with creating a new segment, the segment/server in charge tables 136 are synchronized between respective servers when correspondence relation between the created segment and its server in charge is registered in the segment/server in charge table 136 by one of the servers.

Here, it is also possible to detect the relation between data sets and determine whether or not a data set belongs to a segment in the seventh embodiment, similarly to the second to sixth embodiments. For example, the client 200 includes the identification information of the data set accessed last time in the access request. Each server is capable of grasping data sets sequentially accessed following an access request, and detecting the relation between the data sets. Alternatively, respective servers may notify each other of from which access requestor and to which data set an access request is received. According to the result of detecting the relation between data sets, each server integrates the segment in charge, with segments being handled by other servers. In addition, each server is also capable of dividing a group and a segment when the allocation of cache area to the group managed by the server is released, similarly to the second to sixth embodiments.

For example, the server 100, when changing the data arrangement from the segment handled by the server 100 to the segment handled by the server 100a, transmits the data set to be changed to the server 100a. The server 100a stores the data set received from the server 100 in the segment handled by the server 100a. In this manner, it is possible to change the data arrangement in respective segments across the servers.

Although it is assumed in the description of the second to seventh embodiments that a threshold value is provided for the number of data sets to be caused to belong to a group, a threshold value of the data size (e.g., an amount expressed by the number of bits or bytes) may be used in place of the threshold value of the number of data sets.

Although the RAM 102 is assumed as the cache 110 and the HDD 103 as the data storage unit 120, mainly, in the above description, a combination besides the above is also conceivable. For example, the RAM 102 may be used as the cache 110, and an SSD, the optical disk 13, a tape medium or the like may be used as the data storage unit 120. In addition, an SSD may be used as the cache 110, and the HDD 103, the optical disk 13, a tape medium or the like may be used as the data storage unit 120.

In addition, although a server computer is mainly exemplified in the second to seventh embodiments, a storage device having a processor configured to control data access, a disk device, and a cache memory may be applied to the second to seventh embodiments.

In addition, the information processing of the first embodiment may be realized by causing the operation unit 1c to execute a program. In addition, the information processing in the second to seventh embodiments may be realized by causing the processor provided to each server to execute a program. The program may be stored in a computer-readable storage medium (e.g., the optical disk 13, the memory device 14, the memory card 16, or the like).

For example, a program may be marketed by distributing a storage medium storing the program. In addition, a program may be stored in another computer and the program may be distributed via a network. A computer may store (install), in a storage device such as the RAM 102, the HDD 103, or the like, a program stored in a storage medium or a program received from another computer, for example, and read the program from the storage device and execute it.

In one aspect, the amount of accumulated information about data arrangement and the amount of computation may be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a data arrangement control program that causes a computer to perform a process comprising:
    updating grouping information about grouping of data sets stored in a storage device, based on access information about access to data stored in the storage device and memory loading information about data loaded and held in a memory according to access to data stored in the storage device; and
    updating data arrangement in the storage device according to the updating of the grouping information,
    wherein the updating grouping information includes updating the grouping information based on relationship information between data sets according to the access information; and
    wherein the updating grouping information includes:
    updating, when a relation is detected between a first data set and a second data set which are held in the memory and belong to different groups, and a sum of a size of a first group to which the first data set belongs and a size of a second group to which the second data set belongs does not exceed a threshold value, the first and second groups to a third group including data sets belonging to the first and second groups; and
    increasing the threshold value when the relation is detected, the sum exceeds the threshold value and all data sets belonging to the first and the second groups have been accessed while being held in the memory, and updating the first and second groups to the third group by using the threshold value increased.

2. The non-transitory computer-readable storage medium according to claim 1, wherein the updating grouping information includes excluding, when allocation of storage area of the memory to a third data set is released and the third data set has not been accessed while being held in the memory, the third data set from a group to which the third data set belongs.

3. The non-transitory computer-readable storage medium according to claim 1, wherein the updating grouping information includes excluding, when allocation of storage area of the memory to a third data set is released, the third data set from a group to which the third data set belongs, according to access to the third data set while the third data set is held in the memory; and
    wherein the process further includes determining whether or not to exclude the third data set from the group to which the third data set belongs, according to an access count to other data sets in the group.

4. A data arrangement control method comprising:
    updating, by a processor, grouping information about grouping of data sets stored in a storage device, based on access information about access to data stored in the storage device and memory loading information about data loaded and held in a memory according to access to data stored in the storage device; and
    updating, by the processor, data arrangement in the storage device according to the updating of the grouping information,
    wherein the updating grouping information includes updating, by the processor, the grouping information based on relationship information between data sets according to the access information; and
    wherein the updating grouping information includes:
    updating, by the processor, when a relation is detected between a first data set and a second data set which are held in the memory and belong to different groups, and a sum of a size of a first group to which the first data set belongs and a size of a second group to which the second data set belongs does not exceed a threshold value, the first and second groups to a third group including data sets belonging to the first and second groups; and
    increasing, by the processor, the threshold value when the relation is detected, the sum exceeds the threshold value and all data sets belonging to the first and the second groups have been accessed while being held in the memory, and updating the first and second groups to the third group by using the threshold value increased.

5. A data arrangement control apparatus comprising:
    a memory capable of holding data sets; and
    a processor configured to perform a process including:
    updating grouping information about grouping of data sets stored in a storage device, based on access information about access to data stored in the storage device and memory loading information about data loaded and held in a memory according to access to data stored in the storage device; and
    updating data arrangement in the storage device according to the updating of the grouping information,
    wherein the updating grouping information includes updating the grouping information based on relationship information between data sets according to the access information; and
    wherein the updating grouping information includes:
    updating when a relation is detected between a first data set and a second data set which are held in the memory and belong to different groups, and a sum of a size of a first group to which the first data set belongs and a size of a second group to which the second data set belongs does not exceed a threshold value, the first and second groups to a third group including data sets belonging to the first and second groups; and increasing the threshold value when the relation is detected, the sum exceeds the threshold value and all data sets belonging to the first and the second groups have been accessed while being held in the memory, and updating the first and second groups to the third group by using the threshold value increased.

\* \* \* \* \*